US007485038B2

(12) United States Patent
Rothkranz et al.

(10) Patent No.: US 7,485,038 B2
(45) Date of Patent: *Feb. 3, 2009

(54) GAMING DEVICE HAVING MULTIPLE AWARD REELS AND MOVING INDICATOR

(75) Inventors: Markus Rothkranz, Las Vegas, NV (US); Kirk A. Tedsen, Reno, NV (US); Kehl T. LeSourd, Reno, NV (US)

(73) Assignee: IGT, Reno, NV (US)

(*) Notice: Subject to any disclaimer, the term of this patent is extended or adjusted under 35 U.S.C. 154(b) by 1081 days.

This patent is subject to a terminal disclaimer.

(21) Appl. No.: 10/659,092

(22) Filed: Sep. 9, 2003

(65) Prior Publication Data

US 2005/0054422 A1 Mar. 10, 2005

(51) Int. Cl.

| | |
|---|---|
| ***A63F 13/00*** | (2006.01) |
| ***A63F 9/24*** | (2006.01) |
| ***A63F 1/00*** | (2006.01) |
| ***A63F 1/18*** | (2006.01) |
| ***G06F 17/00*** | (2006.01) |
| ***G06F 19/00*** | (2006.01) |
| ***A63B 71/00*** | (2006.01) |

(52) U.S. Cl. ............................ 463/20; 463/16; 463/21; 463/25; 273/138.1; 273/139

(58) Field of Classification Search ............ 463/16–29; 273/138.1, 139, 141 R, 141 A, 142 R, 142 A, 273/142 B, 142 C, 142 D See application file for complete search history.

(56) References Cited

U.S. PATENT DOCUMENTS

| | | | | |
|---|---|---|---|---|
| 2,486,752 | A * | 11/1949 | Michael | 273/141 R |
| 2,545,644 | A | 3/1951 | Benton et al. | |
| 3,795,022 | A | 8/1976 | Figueroa | |
| 4,182,515 | A | 1/1980 | Nemeth | |

(Continued)

FOREIGN PATENT DOCUMENTS

| | | |
|---|---|---|
| EP | 1 003 138 A2 | 5/2000 |

(Continued)

OTHER PUBLICATIONS

4DU Dice Unit advertisement written by starpoint.uk.com, printed on Sep. 3, 2002.

(Continued)

*Primary Examiner*—Robert E Pezzuto
*Assistant Examiner*—Binh-An D Nguyen
(74) *Attorney, Agent, or Firm*—Bell, Boyd & Lloyd LLP

(57) ABSTRACT

A gaming device having a display with multiple rotating award reels and an award indicator that moves in multiple directions to indicate one of the awards on one of the award reels is provided. In one embodiment, the reels rotate horizontally and in different directions. The indicator resides at the distal end of a member. The member is attached to a base. The base moves at least vertically so that the indicator covers or reaches each rotating award reel. The base can also move horizontally or rotate to change in both X and Y directions. When the indicator and reels stop moving, the indicator points to or indicates an award that is provided to a player as either a primary or bonus award of the gaming device.

28 Claims, 16 Drawing Sheets

U.S. PATENT DOCUMENTS

| | | | | |
|---|---|---|---|---|
| 4,410,178 | A | 10/1983 | Partridge | |
| 4,624,459 | A | 11/1986 | Kaufman | |
| 4,695,053 | A | 9/1987 | Vazquez, Jr. et al. | |
| 4,732,386 | A | 3/1988 | Rayfiel | |
| 4,991,848 | A | 2/1991 | Greenwood et al. | |
| 5,116,055 | A | 5/1992 | Tracy | |
| 5,152,529 | A | 10/1992 | Okada | |
| 5,310,190 | A * | 5/1994 | Morris | 273/243 |
| 5,364,100 | A * | 11/1994 | Ludlow et al. | 273/143 R |
| 5,395,111 | A | 3/1995 | Inoue | |
| 5,449,173 | A | 9/1995 | Thomas et al. | |
| 5,456,465 | A | 10/1995 | Durham | |
| 5,542,669 | A | 8/1996 | Charron et al. | |
| 5,560,603 | A | 10/1996 | Seelig et al. | |
| 5,584,763 | A | 12/1996 | Kelly et al. | |
| 5,584,764 | A | 12/1996 | Inoue | |
| 5,609,524 | A | 3/1997 | Inoue | |
| 5,664,998 | A | 9/1997 | Seelig et al. | |
| 5,711,525 | A | 1/1998 | Breeding | |
| 5,752,881 | A | 5/1998 | Inoue | |
| 5,823,872 | A | 10/1998 | Prather et al. | |
| 5,823,874 | A | 10/1998 | Adams et al. | |
| D400,597 | S | 11/1998 | Hedrick et al. | |
| 5,833,538 | A | 11/1998 | Weiss | |
| D402,702 | S | 12/1998 | Seelig et al. | |
| 5,848,932 | A | 12/1998 | Adams | |
| 5,851,147 | A | 12/1998 | Stupak et al. | |
| 5,873,781 | A | 2/1999 | Keane | |
| D406,865 | S | 3/1999 | Heidel | |
| 5,882,261 | A | 3/1999 | Adams | |
| 5,911,418 | A | 6/1999 | Adams et al. | |
| 5,927,714 | A | 7/1999 | Kaplan | |
| 5,938,529 | A | 8/1999 | Rodesch et al. | |
| 5,976,015 | A | 11/1999 | Seelig et al. | |
| 6,004,207 | A | 12/1999 | Wilson, Jr. et al. | |
| 6,015,346 | A | 1/2000 | Bennett | |
| 6,059,658 | A | 5/2000 | Mangano et al. | |
| 6,086,066 | A | 7/2000 | Takeuchi et al. | |
| 6,089,976 | A | 7/2000 | Schneider et al. | |
| 6,089,977 | A | 7/2000 | Bennett | |
| 6,089,978 | A | 7/2000 | Adams et al. | |
| 6,102,798 | A | 8/2000 | Bennett | |
| 6,105,962 | A | 8/2000 | Malavazos et al. | |
| 6,113,098 | A | 9/2000 | Adams | |
| 6,142,873 | A | 11/2000 | Weiss et al. | |
| 6,142,874 | A | 11/2000 | Kodachi et al. | |
| 6,155,925 | A | 12/2000 | Giobbi et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,173,955 | B1 | 1/2001 | Perrie et al. | |
| 6,190,255 | B1 | 2/2001 | Thomas et al. | |
| 6,203,429 | B1 | 3/2001 | Demar et al. | |
| D441,031 | S | 4/2001 | Seelig et al. | |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,970 | B1 | 5/2001 | Shimizu et al. | |
| D443,313 | S | 6/2001 | Brettschneider | |
| 6,251,013 | B1 | 6/2001 | Bennett | |
| 6,254,481 | B1 * | 7/2001 | Jaffe | 463/20 |
| 6,261,177 | B1 | 7/2001 | Bennett | |
| 6,267,669 | B1 | 7/2001 | Luciano, Jr. et al. | |
| 6,270,411 | B1 | 8/2001 | Gura et al. | |
| 6,302,790 | B1 | 10/2001 | Brossard | |
| 6,305,686 | B1 | 10/2001 | Perrie et al. | |
| 6,315,663 | B1 | 11/2001 | Sakamoto | |
| 6,315,664 | B1 | 11/2001 | Baerlocher et al. | |
| 6,336,863 | B1 | 1/2002 | Baerlocher et al. | |
| 6,340,158 | B2 | 1/2002 | Pierce et al. | |
| 6,368,216 | B1 | 4/2002 | Hedrick et al. | |
| 6,386,974 | B1 | 5/2002 | Adams | |
| 6,398,220 | B1 | 6/2002 | Inoue | |
| 6,419,579 | B1 | 7/2002 | Bennett | |
| 6,461,241 | B1 | 10/2002 | Webb et al. | |
| D465,531 | S | 11/2002 | Luciano, Jr. et al. | |
| 6,481,713 | B2 | 11/2002 | Perrie et al. | |
| 6,533,660 | B2 | 3/2003 | Seelig et al. | |
| 6,537,152 | B2 * | 3/2003 | Seelig et al. | 463/30 |
| 6,582,307 | B2 | 6/2003 | Webb | |
| 6,609,972 | B2 | 8/2003 | Seelig et al. | |
| 6,712,694 | B1 | 3/2004 | Nordman | |
| 2002/0094861 | A1 | 7/2002 | Seelig et al. | |

FOREIGN PATENT DOCUMENTS

| | | |
|---|---|---|
| GB | 338504 | 11/1930 |
| GB | 912685 | 12/1962 |
| GB | 2 201 821 | 9/1988 |
| GB | 2 383 668 | 7/2003 |

OTHER PUBLICATIONS

American Bandstand advertisement written by Anchor Games, published in 2001.
A Salute to Game Shows-The Price is Right-Pricing Games, taken from http:ben-schumin.simplenet.com/game-shows/shows/price-is-right/pricing-games-4.htm, printed on Aug. 16, 2000.
Big Shot!™ advertisement published by Aristocrat Technologies, Inc., published in 2002.
Big Top Keno advertisment published by Aristocrat Technologies, Inc., published in 2000.
Bonus Roulette advertisement written by R. Franco, published prior to Sep. 9, 2003.
Buck's Roulette advertisement written by R. Franco, published prior to Sep. 9, 2003.
Chariot's of Fortune advertisement written by R. Franco, published prior to Sep. 9, 2003.
Classic Pot of Gold advertisement written by Ace Coin Equipment Ltd., published prior to Sep. 9, 2003.
Clock Game description, taken from URL:http://qscentral.net/clock.htm, printed on Aug. 18, 2000.
Cyberdyne Gaming advertisement written by Cyberdyne Gaming, published prior to Sep. 9, 2003.
Elvira® Mistress of the Dark™ advertisement written by IGT, published in 2002.
Elvis Hits advertisement written by IGT, published in 1999.
Jack and the Beanstalk™ advertisement written by AC Coin & Slot, published prior to Sep. 9, 2003.
Jackpot Party advertisements and articles, published by WMS Gaming Inc., 1998.
Jackpot Party article taken from www/wmsgaming.com, printed on Feb. 7, 2001.
King of the Grill™ advertisement written by AC Coin & Slot, published prior to Sep. 9, 2003.
Line-Up advertisement written by AC Coin & Slot, published prior to Sep. 9, 2003.
Little Green Men Jr.™ advertisement written by AC Coin & Slot, published prior to Sep. 9, 2003.
Little Green Men Jr.™ article written by Strictly Slots, published in Feb. 2003.
Miss America advertisement written by AC Coin & Slot, published prior to Sep. 9, 2003.
Mix and Match article written by Strictly Slots, published in Apr. 2002.
Mix and Match advertisement published by AC Coin & Slot, published prior to Sep. 9, 2003.
Money Grab article written by Strictly Slots, published in Apr. 2001.
Monster Match article written by Strictly Slots, published in Jan. 2002.
On The Money! article written by Strictly Slots, published in Dec. 2000.
Payout!™ article written by Casino Data Systems, published prior to Sep. 9, 2003.

Pick a Prize advertisement written by Acres Gaming Incorporated, published prior 2001.
Power Slotto advertisement published by AC Coin & Slot prior to 2002.
Press Your Luck advertisement published by AC Coin & Slot prior to 2002.
Quick Pick Paytime advertisement written by Acres Gaming Incorporated, published prior to 2001.
R&B™ advertisement published by AC Coin & Slot, published prior to Sep. 9, 2003.
Reel Dice advertisement written by Gerber & Glass, published in 1936.
Royal Roulette advertisement written by Impulse Gaming Ltd., published prior to Sep. 9, 2003.
Schwartz, David, Ryan, Steve, and Wostbrock, Fred. The Encyclopedia of TV Game Shows. Third Ed. Checkmark Books, New York: 1999 pp. 176-180.
Slot Machine Buyer's Handbook, A Consumer's Guide to Slot Machines written by David L. Saul and Daniel R. Mead, published in 1998.
Silver City Roundup advertisement published by AC Coin & Slot, published prior to Sep. 9, 2003.
Slot Machines A Pictorial History of the First 100 Years, 5$^{th}$ edition written by Marshall Fey, published in 1983-1987.
Slot Machines on Parade, 1st edition written Robert N. Geddes and illustrated by Daniel R. Mead, published in 1980.
Slots 2003 written by Melissa Raimondi, published by Strictly Slots in Jan. 2003, pp. 54-57.
Spin-A-Lot advertisement written by Acres Gaming Incorporated, published prior to 2001.
Take Your Pick article written by Strictly Slots, published in Mar. 2001.
Ten Chances game description, taken from http://gscentral.net/10chan.htm, printed on Mar. 16, 2003.
The Price is Right advertisement written by IGT, published in 2001.
The Price is Right article, taken from www.curtalliaume.com/tpir.html, published on Jul. 18, 2002.
The Price is Right Plinko advertisement written Strictly Slots, published in Dec. 2001.
The Price is Right Video Slots advertisement written by IGT, published in 2001.
Welcome To Video Reality advertisement written Atronic Casino Technology Ltd., published in 1995.
Yahtzee Bonus advertisement written by Mikohn, published in 1999.

* cited by examiner

GAMING DEVICE HAVING MULTIPLE AWARD REELS AND MOVING INDICATOR

BACKGROUND OF THE INVENTION

The present invention relates to gaming devices and more particularly, to a display for a wagering gaming device having multiple award reels and a indicator that is operable to move transversely to the reels.

Gaming devices, such as slot machines and video poker machines, provide fun and excitement to the player. Gaming, in general, provides an escape from the everyday rigors of life. Gaming devices use bright lights and exciting sounds to have the gaming machines stand out from other gaming machines. Gaming devices, in particular, use one or more displays that enable the player to see and play the game. The displays typically portray the action of the game and ultimately indicate whether or not the player wins and how much the player wins.

Slot machine and other gaming device displays have gone through a number of transitions since their inception. Originally, slot machines displayed purely mechanical reels. While these machines gained enormous popularity, the mechanical nature of the reels limited the number of paystops, which limited the number of different symbols and the number of different winning symbol combinations.

The advent of the computer and the video monitor expanded the possibilities for gaming devices. There are now video poker, video blackjack and other types of video gaming machines. Video displays have also been implemented in slot machines. The video slot machines use computers to randomly generate symbol combinations from an expanded number of different symbols. Video reel strips can include a virtually unlimited number of symbols, which enables a wide variety of different symbol combinations to be employed, including combinations that appear very infrequently and yield high payouts.

With slot machines, the video monitors have also been used to provide bonus or secondary games. Bonus games in gaming machines have become much more prevalent and elaborate in recent years. For example, players play the base game of slot until becoming eligible for a bonus game. The base game temporarily pauses, while the player plays the bonus game. When the player completes the bonus game, the gaming device returns the player to the base game.

It should therefore be appreciated that a single video monitor is often sufficient to provide both the base game of slot and one or more bonus games that become triggered by the slot game. As illustrated in FIGS. 1A and 1B, there is room on the cabinet of gaming device 10 for an upper display area 32. That area, however, is often not utilized for gaming purposes and may simply provide a paytable, graphics and/or lettering that pertains to a theme of the gaming device.

Video monitors and in particular video-based slot machines are likely going to continue growing in popularity. As the video monitor has been used more and more, however, there has been a growing sentiment that some of the mystique of the old time mechanical gaming devices is lost when mechanical reels and mechanical displays are replaced by a video monitor.

Accordingly, a need exists to provide a gaming device that may use a video monitor, which provides increased flexibility to the gaming device to add more symbols and more elaborate bonus games, while providing some aspect of the gaming device that is mechanical and provides a fun and exciting mechanical display.

SUMMARY OF THE INVENTION

The present invention provides a display device for a gaming device and in one embodiment an electromechanical display device for a wagering gaming device such as a slot machine. In one embodiment, the display device includes multiple rotating outcome or award reels and an outcome or award indicator movable in at least one direction (i.e., transversely to the movement of the reels) to indicate one of the outcomes or awards on one of the outcome or award reels. In one embodiment, the outcome or award indicator is positioned in front of the reels (i.e., relative to the player's line of sight) and is adapted to move to cover a portion of each of the reels.

In one embodiment, certain of the reels rotate substantially horizontally or along a substantially vertically extending axis and in different directions. In one embodiment, the indicator resides at the distal end of a member. The member is attached to a base. In one embodiment, the base which is positioned above the reels is movable transversely to the reels such that the indicator is movable to cover or reach each rotating award reel. In one alternative embodiment, the base is also movable in direction of the movement of the reels (or adapted to rotate in both X and Y directions). When the indicator and reels stop moving, the indicator points to or indicates an award on one of the reels that is provided to a player as either a primary or secondary outcome.

The display device is operable in a primary or base game or as a bonus or secondary game played in conjunction with a primary or base game. In one embodiment, the display device resides on an upper panel of a slot machine, located above the slot machine reels. The display device can follow a theme of the slot machine. However, the display device is not limited to any one particular theme. The display device is not limited to reels that rotate in horizontal planes but instead can have reels that rotate in vertical planes or in angled planes and an indicator that translates relative to the planes of rotation of the reels. In one embodiment, the indicator translates in a direction that is substantially perpendicular to the planes in which the reels rotate. In other embodiments however, the indicator moves alternatively or additionally at some angle with respect to the planes of rotation of the reels.

Each reel includes and displays at least one award symbol. In one embodiment, at least one of the reels displays a row of award symbols. In another embodiment, at least one of the reels displays a plurality of rows of award symbols. In one implementation, two sets or groups of staggered award symbols are provided on the reels. The award symbols can collectively indicate the same or different types of awards. The award symbols can also accumulate towards an ultimate award provided to the player. In that manner, the award symbols indirectly determine the award that the gaming device provides to the player. The outcome or award is provided in one of a plurality of different forms, such as base game credits, a multiplier of base game credits, a number of selections from a prize pool, a number of free spins, a number of free games, a non-monetary award and any combination thereof.

In one embodiment, each of the reels and the indicator operates with a separate motion-producing device. In one implementation, each of the motion-producing devices is a stepper motor. Providing separate stepper motors for each reel enables the reels to perform complex motion control sequences.

In one embodiment, at least two adjacent reels rotate in opposite directions. The indicator is connected to a base. A separate stepper motor is coupled to a lead screw. The base is threaded or is attached to a nut that threads onto the lead screw. When the stepper motor turns the lead screw, the base translates along the lead screw and in turn translates the member attached to the base and the indicator attached to the member. The indicator moves across the different reels (which are rotating in different directions) and points to or indicates different symbols on the reels. In one implementation, the awards increase in value from one reel to the next, so that the player hopes that the indicator stops on the reel having the highest valued symbols.

In one embodiment, a first member or fisherman and a second member or boat operate with a plurality of horizontally rotating reels. The indicator is located at the bottom of the fisherman's pole. The fisherman and pole move vertically up and down to indicate different awards on different reels. In one embodiment, the boat and fisherman move together. In another embodiment the fisherman moves inside and relative to the boat, while the boat remains vertically stationary. In a further embodiment, the fisherman and boat move independently with respect to each other.

In one alternative embodiment, the indicator base assembly is spring-loaded and biased to follow a profile defined by one of the reels that contacts the base or indicator attached to the base. One embodiment of the present invention uses a reel that has sinusoidal-like depressions and projections. As the reel turns, the spring pulls the base and indicator towards the surface of the reel so that the base and indicator follow or ride along the indentations and projections.

In addition to moving vertically or translationally, the base, member and indicator in one alternative embodiment can additionally move horizontally or in a circular manner. The indicator can therefore either approach and indicate one of the award symbols in a substantially perpendicular manner or at an angle, for example, when the indicator moves in a circular manner.

The indicator indicates the award in one of a variety of ways. In one way, the indicator encloses an open area around the indicated or selected award. The open area enables the player to see the award. To that end, the indicator can house a viewing glass or clear plastic piece. In another embodiment, the indicator points to the selected award. Here, the indicator includes a pointed end or indicating end that points to the award. After the gaming device provides the selected award symbol to the player, the game ends or the player returns to the base game depending on the role of the display device within the gaming device.

In one embodiment, the electrochemical display device operates with a video monitor to display a bonus game based on a base game, such as slot. The video monitor displays initially a set of choices to the player. The player picks one of the choices, which yields a number of plays of the electromechanical display device. The player then initiates the number of plays on the electromechanical display device, each play yielding an award value or a mystery value. After each of the plays, the game provides the player an option to keep each of the values or change one or more of the values for a new value. The player receives a number of values that are totaled to form the player's bonus award whether or not the option is exercised.

It is therefore an advantage of the present invention to provide a fun and interesting gaming device display.

It is another advantage of the present invention to provide a fun and interesting apparatus and method for designating an award for a player.

It is a further advantage of the present invention to provide a display device that operates with a primary or bonus game.

It is still another advantage of the present invention to provide a display device having multiple reels that rotate in opposite directions and an indicator that translates relative to a plurality of rotating award reels.

Additional features and advantages of the present invention are described in, and will be apparent from, the following Detailed Description of the Invention and the figures.

DETAILED DESCRIPTION OF THE INVENTION

The present invention provides a display device that operates with a multitude of primary or base wagering games, including but not limited to the games of slot, poker, keno, blackjack, craps and bunco. In an embodiment, the display device operates in conjunction with a secondary or bonus game, which in turn operates in conjunction with the above-listed primary games. Besides such base and bonus games, the present invention can operate with any of the bonus triggering events, as well as any progressive game coordinating with those base games. The symbols and indicia used for any of the primary or base games, bonus or secondary games or progressive games include any suitable symbols, images or indicia.

Figure 1A:
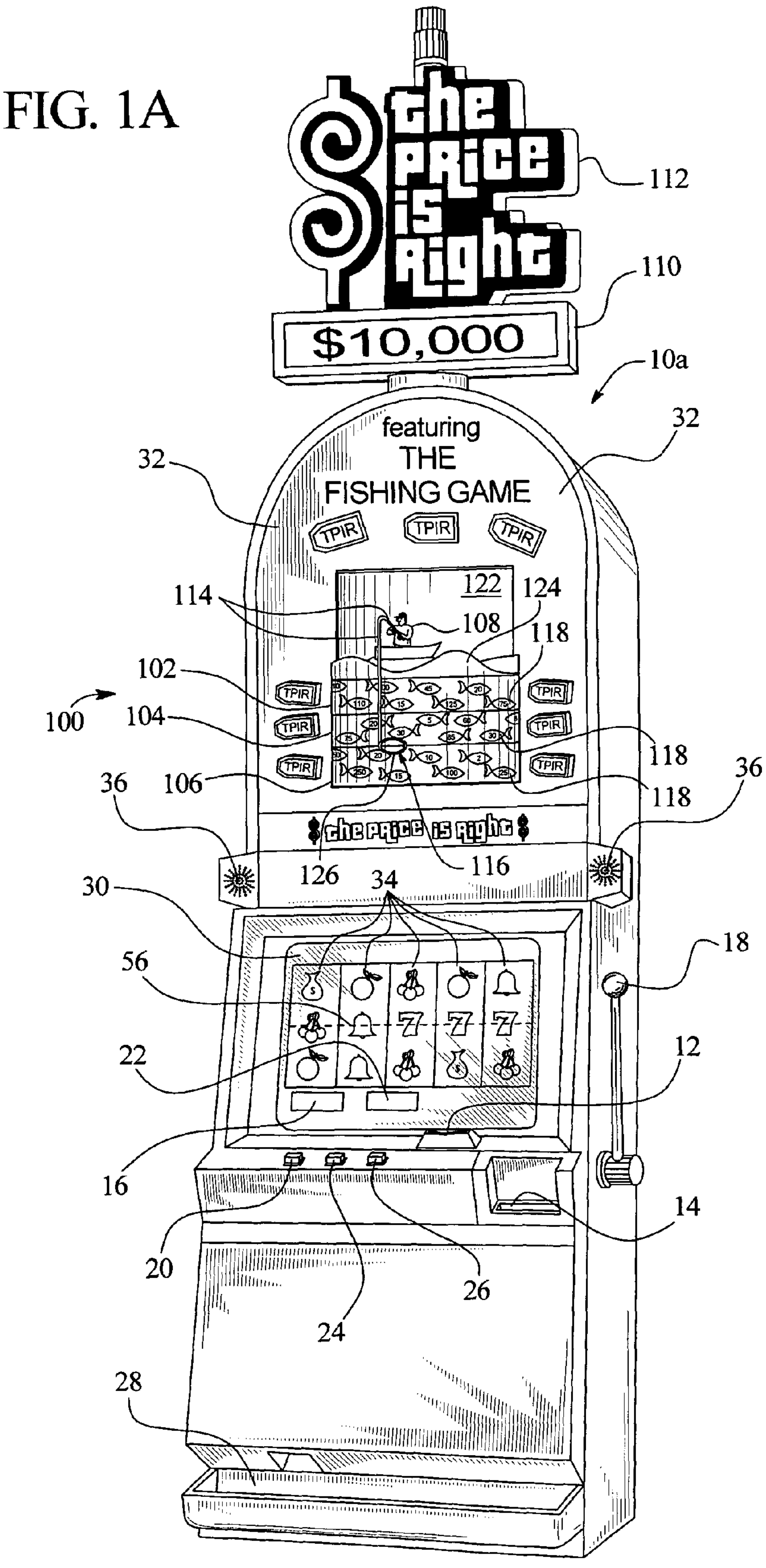
FIGS. 1A and 1B are perspective views of alternative embodiments of the gaming device of the present invention.
Figure 1B:
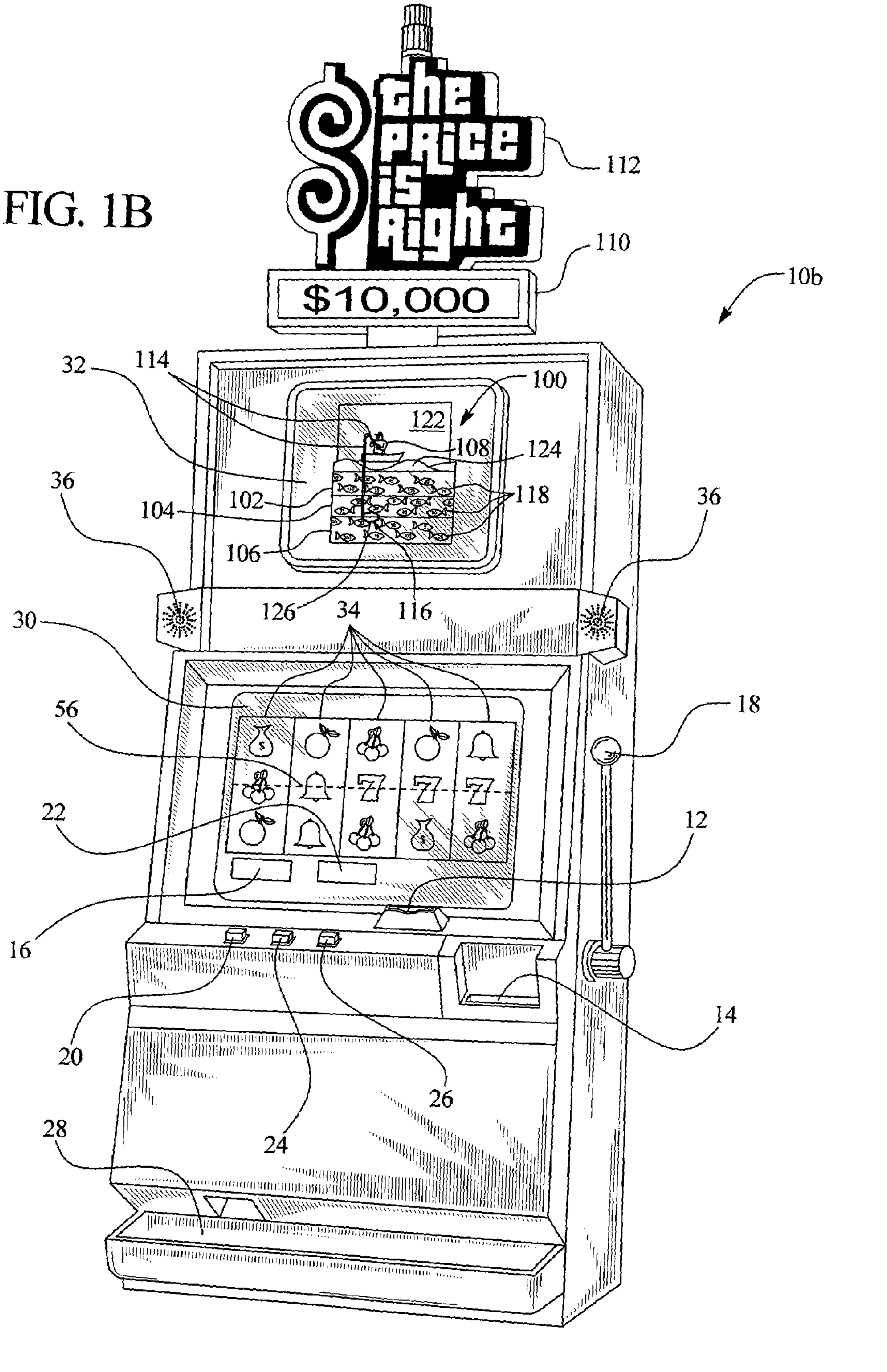

One primary embodiment for the multiple award reels and moving indicator of the present invention is with a slot game. Referring now to the drawings, and in particular to FIGS. 1A and 1B, one slot machine embodiment is illustrated. Gaming devices 10*a* and 10*b* illustrate two possible cabinet styles and display arrangements and are collectively referred to herein as gaming device 10. Gaming device 10 is illustrated as having the controls, displays and features of a conventional slot machine, wherein the player operates the gaming device while standing or sitting. Gaming device 10 can also be a pub-style or table-top game (not shown) for which a player operates while sitting.

Gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player increases the bet by one credit each time the player pushes the bet one button 24. When the player pushes the bet one button 24, the number of credits shown in the credit display 16 decreases by one, and the number of credits shown in the bet display 22 increases by one. A player cashes out by pushing a cash out button 26 to receive coins or tokens in the coin payout tray 28 or to receive other forms of payment, such as an amount printed on a ticket or credited to a credit card, debit card or smart card. Well known ticket printing and card reading machines (not illustrated) are commercially available.

Gaming device 10 also includes one or more display devices. The embodiments shown in FIGS. 1A and 1B include a display device 30 and a cabinet having an upper display area 32. The display device 30 includes any viewing surface, such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The multiple award reels and moving award indicators 100, 150 and 200 of the present invention are provided, in one embodiment, in the upper display area 32 of the cabinets of gaming devices 10*a* and 10*b* of FIGS. 1A and 1B. Gaming device 10*a* of FIG. 1A includes a progressive award meter 110 and theme related indicia 112 above upper display area 32 in the illustrated embodiment. An alternative display device 200 having the moving indicator and award reels of the present invention is provided, in another embodiment, on top of the rounded cabinet of gaming device 10*a* or as illustrated, on top of rectangular cabinet of gaming device 10*b*. In a further embodiment, the top portion or top box of the gaming device is removed, creating a lower profile machine. Here, one of the display devices 100, 150 or 200 of the present invention is provided on top of gaming device 10 but is lower to the ground than if the top box is not removed. Any of the display devices 100, 150 and 200 is alternatively provided in or on any suitable area of gaming devices 10*a* or 10*b*.

The slot machine embodiment of gaming device 10 includes a plurality of reels 34, for example three to five reels 34. Each reel 34 includes a plurality of indicia such as bells, hearts, fruits, numbers, letters, bars or other images which correspond to a theme associated with gaming device 10. If the reels 34 are in video form, the display device displaying the video reels 34 is, in one embodiment, a video monitor. Gaming device 10 includes speakers 36 for making sounds or playing music.

With reference to the slot machine base game of FIGS. 1A and 1B, to operate gaming device 10, the player inserts the appropriate amount of tokens or money in a coin slot 12 or a payment acceptor 14 and then pulls arm 18 or pushes play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, gaming device 10, including any of the base games disclosed above, also includes bonus games that give players the opportunity to win credits. Gaming device 10 can employ a video-based display device 30 for the bonus games. The bonus games include a program that automatically begins when the player achieves a qualifying condition in the base game. The bonus game is also operated, in one embodiment, via one of the display devices 100, 150 or 200.

Figure 2:
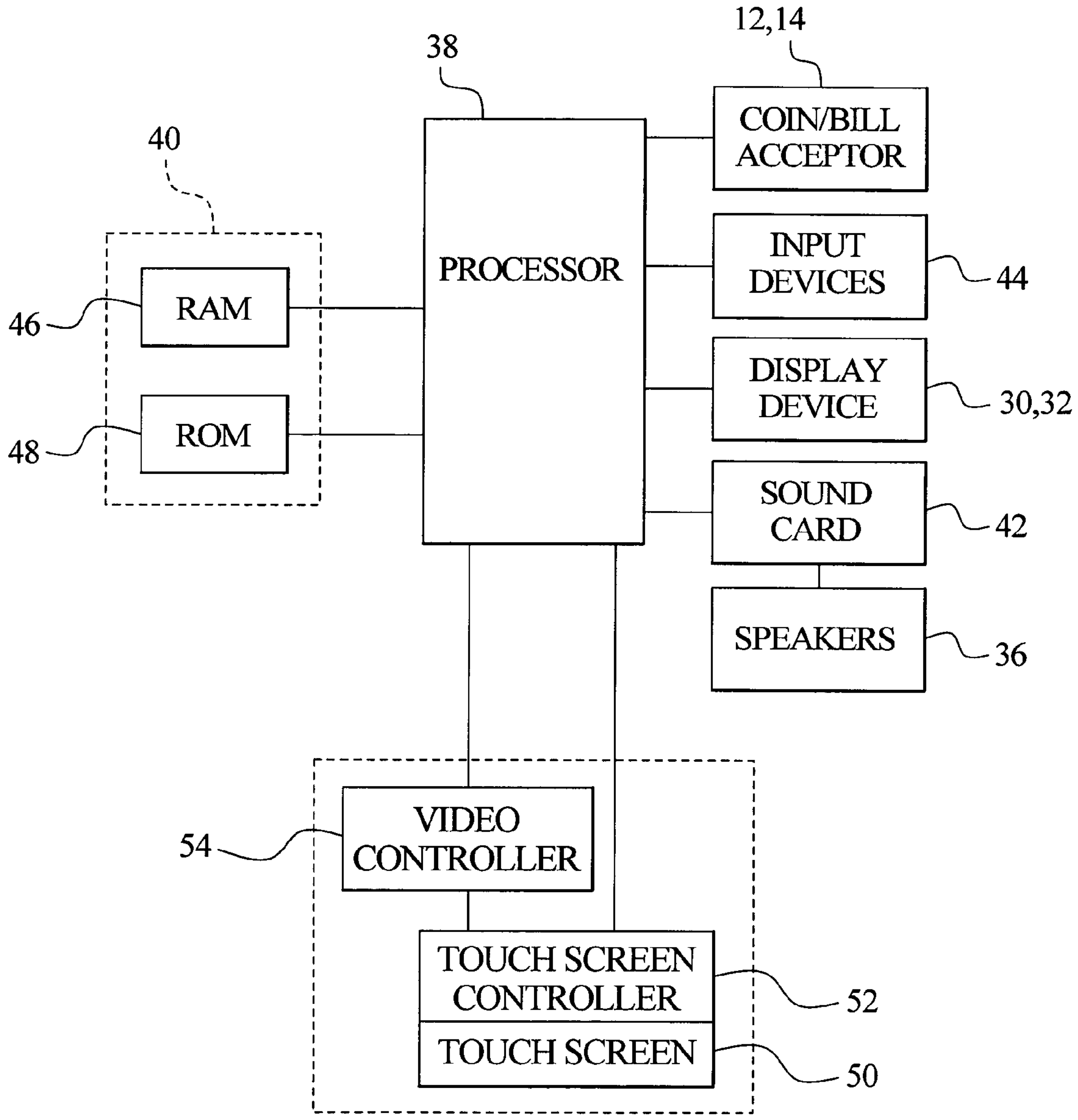
FIG. 2 is a schematic block diagram of the electronic configuration of one embodiment of the gaming device of the present invention.

Referring now to FIG. 2, one embodiment of an electronic configuration for gaming device 10 includes: a processor 38, a memory device 40 for storing program code or other data, a display device 30, a sound card 42, a plurality of speakers 36, and one or more input devices 44. The processor 38 is a microprocessor based platform that is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player uses the input devices 44 to input signals into gaming device 10. In the slot machine base game, the input devices 44 include pull arm 18, play button 20, the bet one button 24, the cash out button 26 and other player inputs. A touch screen 50 and touch screen controller 52 are connected to a video controller 54 and processor 38. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money to start the game.

Processor 38 also controls the output of one of more motion controllers 56 that control one or more motion producing devices 58. The motion producing devices 58 can be any combination of motors, servo motors, AC/DC motors or any other type of device that outputs a rotating member. The motion controllers 56 typically include printed circuit boards or stand alone enclosures that receive high level commands from the processor 38. The motion controller 56 converts the high level commands, for example, into a number of step pulses, which in turn are converted into motor currents. The stepper motor or other type of motion producing device 58 receives the currents, wherein the currents cause, for example, a rotor to turn within a stator a precise and desired amount.

The controllers 56 and motion devices 58 produce a motion control scheme that includes complex movements of multiple parts. That scheme is programmed into the memory device 40 and carried out by the processor 38 at the appropriate time in the sequence of the game, be it a base, bonus, bonus triggering or progressive sequence of gaming device 10. Moreover, multiple programs can be stored, recalled or implemented in the memory device 40. Processor 38 runs the appropriate program at the appropriate time, wherein the multiple rotating award reels and moving award indicator described below perform or move differently, e.g., faster, slower or in different rotational directions at different times or points in the game and in different programs. The motion control programs, in one embodiment, interface with one or more random generation devices, typically software based items, to produce randomly displayed outcomes on the display devices 100, 150 and 200 of the present invention.

Figure 3:
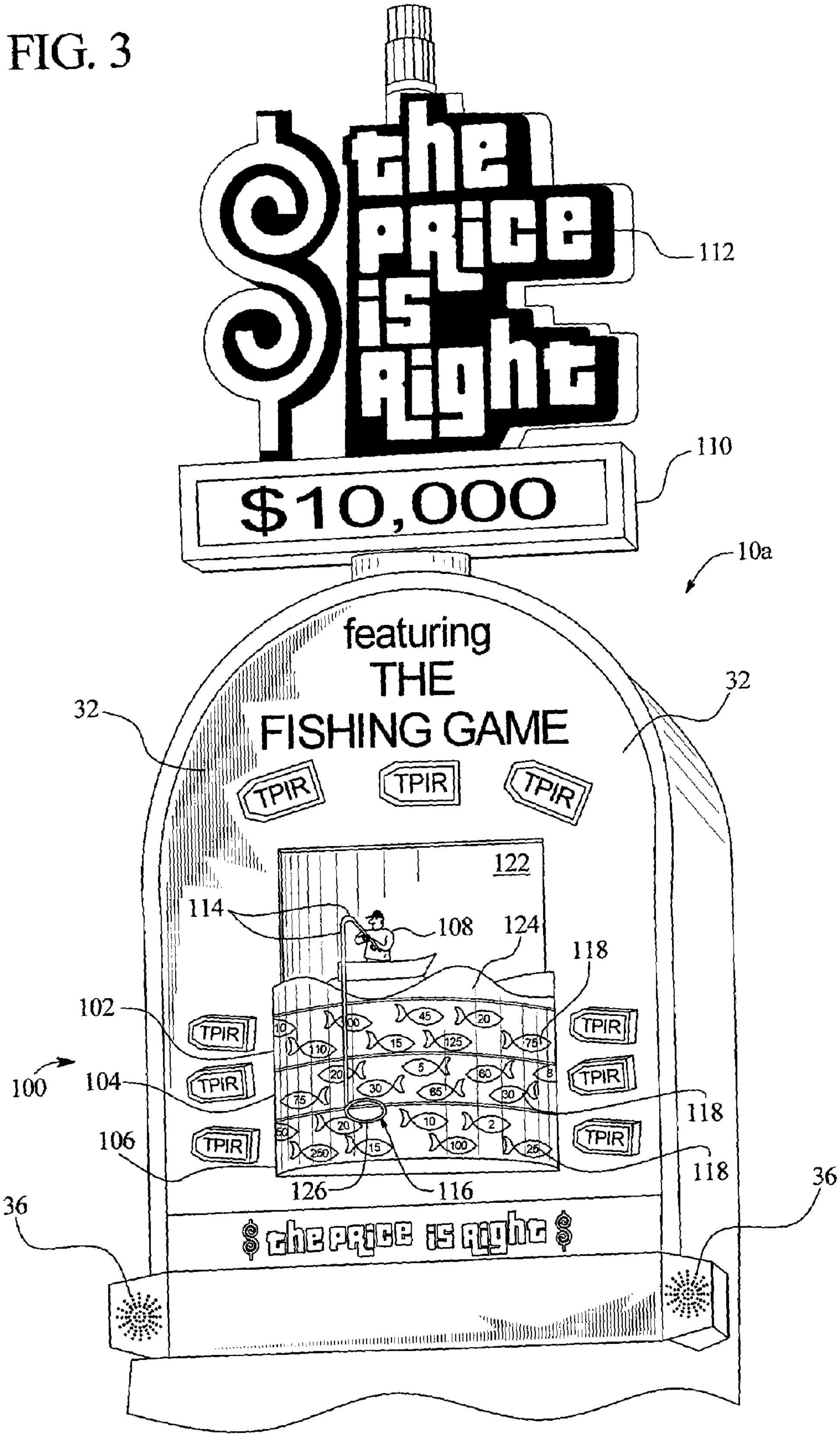
FIG. 3 is an elevation view of the upper display area of the gaming device shown in FIG. 1A including a single indicator.

Referring now to FIG. 3, display device 100 illustrates one embodiment of the present invention. Display device 100 is located in the upper display area 32 shown in FIG. 1A. Display device 100 includes a panel in the upper display area 32. The panel defines an opening that enables a plurality of reels 102, 104 and 106 and a three-dimensional theme related character 108 to reside within such opening. The panel of upper display area 32 also includes a background portion 122 that is located behind character 108 and provides a background for same. Display device 100 is flexible to relate to any suitable type of game theme and to include a multitude of different types and configurations for the reels 102 to 106 and the character 108.

In the illustrated embodiment, the theme of the overall gaming device 10 is the popular television game show the Price is Right®. In the illustrated embodiment, reels 102 to 106 appear as different elevational levels of a lake, river or other body of water for fishing. Each of the levels includes different award symbols 118 having differently valued awards. As illustrated, the fish are oriented in a direction of rotation of the reel. The fish of reels 102 and 106 move left to right, while the fish or awards 118 of reel 104 move right to left. The combination of reels 102 to 106 produces a three-dimensional and visually interesting moving display. A top portion 124 of upper reel 102 is shaped to appear wave-like, with sinusoidal depressions and projections.

The character 108 in the illustrated embodiment is a fisherman in a fishing boat with a fishing pole. The fishing pole and fishing line are collectively referred to herein as a member 114. Member 114 appears to be grasped and moved by the fisherman 108. The fishing line or member 114 translates up and down (i.e., transversely to the reels)) and moves indicator 116 accordingly. Indicator 116 in the illustrated embodiment moves across or transversely to the reels in a direction that is substantially parallel to the axis of rotation of reels 102 to 106. That is, indicator 116 moves substantially perpendicularly to the direction of travel of the fish or symbols 118 of display device 100.

In the illustrated embodiment, the indicator 116 includes a ring 126 that defines an opening that enables the player to see which award symbol 118 is currently indicated by indicator 116. In accordance with the theme of the fishing game, ring 126 is in the shape of a lure from which hangs a hook. The lure 126 is open and in one embodiment houses a piece of glass or clear plastic window that enables a symbol 118 indicated by indicator 116 to show through. In the embodiment illustrated in connection with FIG. 6, an alternative indicator 216 points to a selected award symbol instead of enclosing the symbol.

While the member 114 and indicator 116 translate vertically in the illustrated embodiment, in an alternative embodiment, the member 114 and indicator 116 move horizontally as well as vertically. In such a case, the indicator 116 can approach a symbol 118 from various angles besides 90 degrees or perpendicularly. In a further alternative embodiment, the member 114 and indicator 116 rotate at some desired radius about a pivot point so that the indicator 116 moves in a circular pattern across the reels 102 to 106.

In display device 100, award symbols 118 each include a credit value. Alternatively or additionally, award symbols 118 display other types of awards, such as a multiplier of gaming device credits, a number of picks from a prize pool, a number of free spins, a number of free games, an increase of a progressive award pool, a non-monetary award such as a food or beverage at the casino, a room upgrade, etc., and any combination thereof. Further alternatively, the indicated symbol 118 is a component or a portion of the player's ultimate award. For example, the present invention contemplates providing a progressive award when the player obtains a predefined number of a particular kind of fish. Or, gaming device 10 can require the player to accumulate a predefined number of awards 118 and then sum the total of the selected awards 118 to determine the player's ultimate award.

Figure 3A:
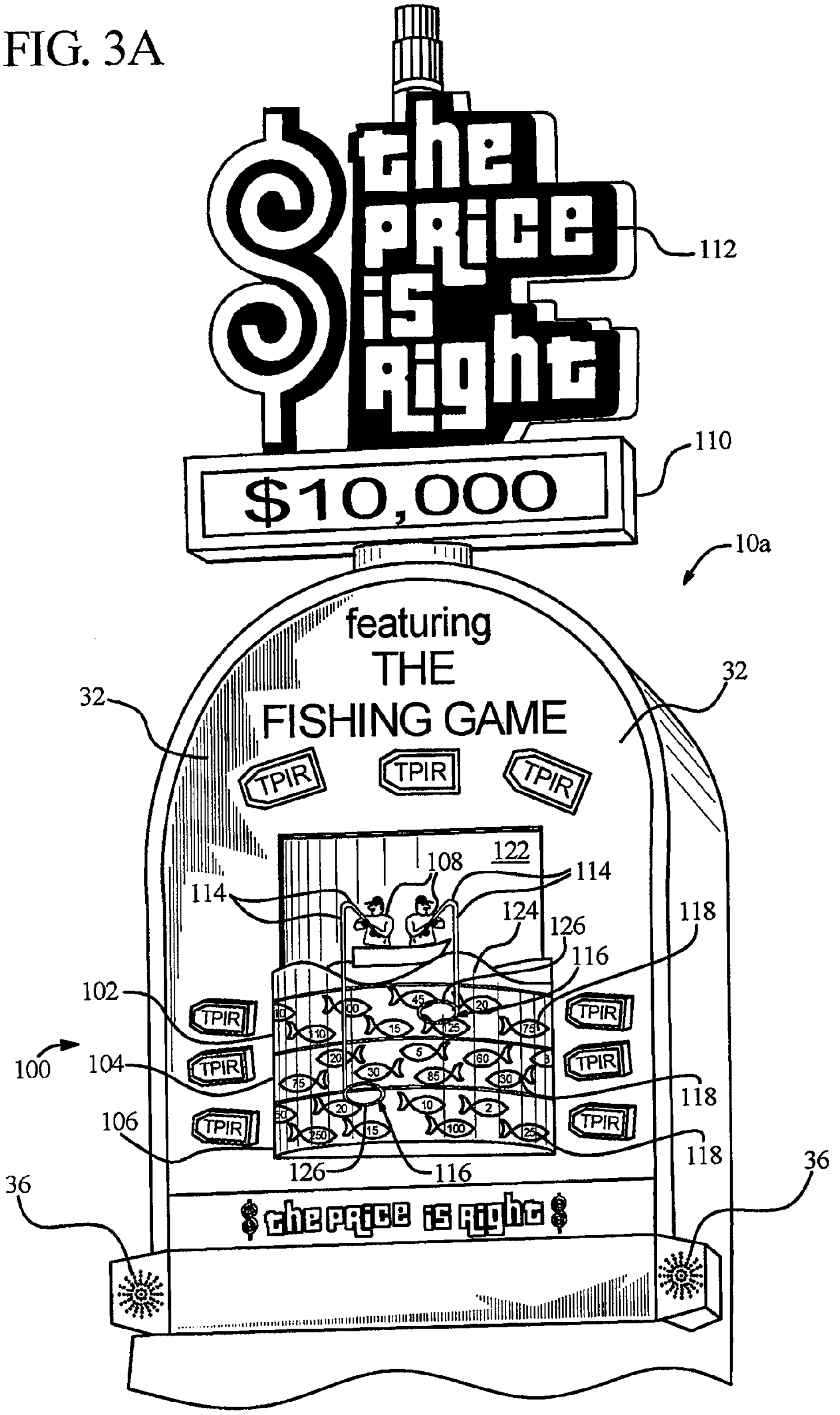
FIG. 3A is an elevation view of the upper display area of the gaming device shown in FIG. 1A including two indicators.

In another embodiment, illustrated by FIG. 3A, display device 100 includes a plurality of fishermen 108, each having a fishing line 114 with an indicator 116. In the illustrated embodiment, a plurality of awards are indicated simultaneously or substantially simultaneously when the multiple indicators 116 and reels 102, 104, and 106 stop moving. The player's ultimate award in various embodiments is based on the awards indicated by the multiple indicators 116. For example, the player's ultimate award may be a combination of the selected award symbols 118 indicated by the indicators indicated. In another example embodiment, the player is provided a choice between the plurality of award symbols 118 indicated by the plurality of indicators 116.

Referring again to FIG. 3, display device 100 provides the player the award symbol 118 that is covered or surrounded by indicator 116 when the indicator stops moving. The reel displaying the selected symbol 118 is therefore also stopped. In one embodiment, each of the reels 102 to 106 stop virtually simultaneously. In another embodiment, the reel displaying the selected symbol stops, wherein the other reels can: (i) continue moving; (ii) stop after the reel displaying the selected symbol stops; or (iii) stop before the reel displaying the selected symbol stops. The independent control of the reels 102, 104, and 106 and the indicator 116 enables a multitude of different motion sequences, starts and stops, angular velocities and accelerations, translational velocities and accelerations and any combination thereof.

Figure 4:
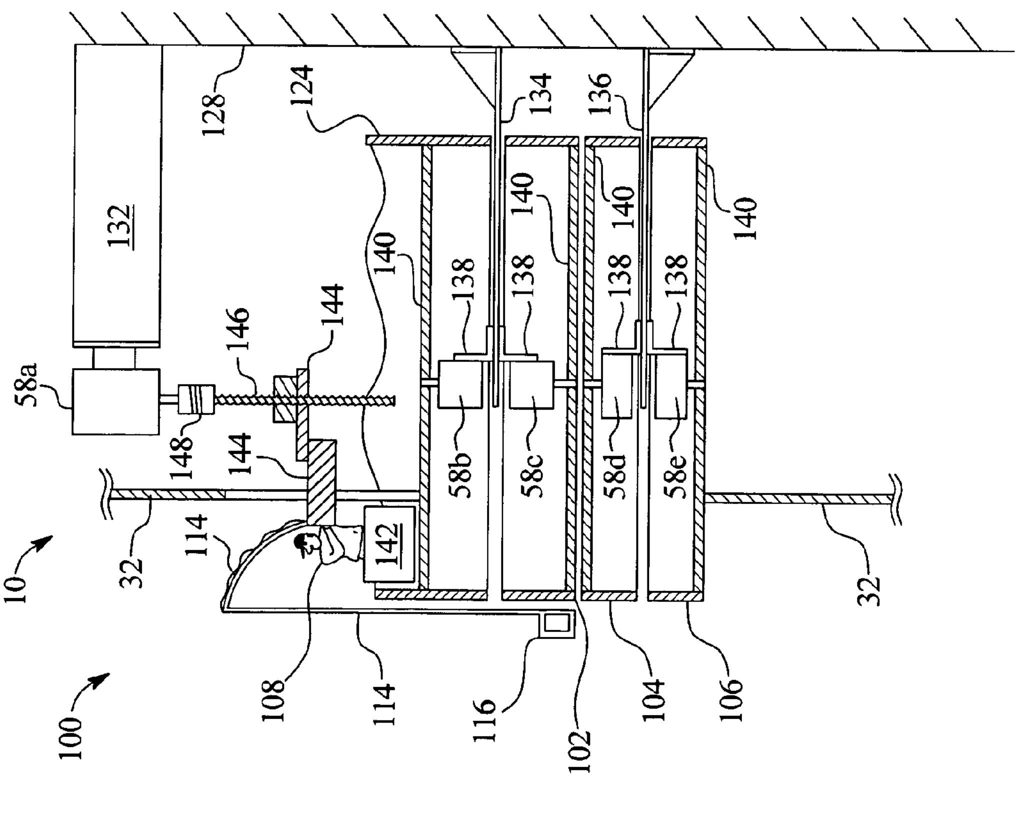
FIG. 4 is a sectioned side view of the gaming device illustrating one embodiment for producing the rotational and translational motion of the display device of the present invention.

Referring now to FIG. 4, an embodiment for configuring the motors that produce the motion of display device 100 is illustrated. The arrangement of FIG. 4 includes five motion producing devices or motors 58*a* to 58*e*. In the illustrated embodiment, each motion-producing device 58 (collectively referring to devices 58*a* to 58*e*) includes a motor having an output shaft that rotates. In one implementation, each of the motors is a stepper motor. The stepper motors receive step pulses from one or more motion controllers 56 (see FIG. 2). Memory device 40 stores at least one motion control program that processor 38 accesses to output high level commands to the one or more motion controllers. The one or more motion controllers 56 receive the high level commands from processor 38. In one embodiment, each stepper motor 58 operates with a separate motion controller 56. In an alternative embodiment, one or more motion controllers can control two or more of the stepper motors 58*a* to 58*e*.

The reels 102 to 106 and indicator 116 of display device 100 are connected to and supported by a structural member 128 of gaming device 10. Motor 58*a* is coupled to structural member 128 via a mount 132. Reel 102 and a separate motion profile portion 124 couple via motors 58*b* and 58*c* respectively and mount 134 to structural member 128. Reels 104 and 106 are coupled via motors 58*d* and 58*e* and are mounted 136 to structural member 128. Any of the reels and the indicator can alternatively be connected to structural members other than member 128.

FIGS. 1A and 3 illustrate an embodiment in which the motion profile portion 124 is connected to and integral with the upper reel 102. That is, the portion 124 rotates simultaneously with upper reel 102 in those figures. In FIG. 4, an alternative embodiment is displayed, wherein motion profile portion 124 rotates separately from upper reel 102. In the embodiment illustrated in FIG. 4, each of the reels 102 to 106 as well as the portion 124 is moved by a unique motor. The illustrated arrangement enables any of the reels and the portion 124 to rotate or not rotate, to rotate at any capable rotational speed, to accelerate at any capable rotational acceleration, to move in opposite directions, to move in the same direction, to change directions, and to start and stop according to a motion control program.

Each of the motors 58*b* to 58*e* is mounted to a mounting flange 138. Each of the mounting flanges 138 is connected to a respective one of the mounts 134 and 136. Also, each of the stepper motors 58*b* to 58*e* are coupled via a coupler (not illustrated) to a strut 140. The struts 140 are connected individually to either the motion profile portion 124 or to one of the reels 102 to 106. Struts 140 in an embodiment include a number of spokes (not shown), which enable the load of the reels or portion 124 to be distributed evenly on the output shaft of the motors 58*b* to 58*e*. That even load displacement helps to reduce uneven wear on the bearings of the motors 58*b* to 58*e*.

As illustrated, reels 102 to 106 and portion 124 extend outwardly from the panel of the upper display area 32 and create thereby a three-dimensional award display. The character or fisherman 108 resides inside a boat 142, which is located between the outer wall of the wave or motion portion 124 and the panel of the upper display area 32. The boat 142 can be fixed, for example, to the panel of upper display area 32. Here, the character or fisherman 108 rises out of and sits into boat 142 as the fishing rod and fishing line 114 and the indicator 116 are translated vertically up or down. The stroke or length of travel of the fisherman 108, rod and line 114 and indicator 116 is sufficient to allow the indicator 116 to move across the full width of each of the reels 102 to 106. In an alternative embodiment, boat 142 is coupled to character 108 and moves with same. In either configuration, the indicator 116 can reach or indicate any of the symbols in any rows of any of the reels 102 to 106.

The rod and line 114 are coupled via a base 144 to a threaded rod 146. Base 144 defines female threads that engage the male threads of threaded rod 146. A portion of the base 144 is a slender but strong elongated portion that extends through a thin slot defined by the panel of upper display area 32. The slot is hidden or masked by a flexible seal that matches the colors of the background 122 (FIG. 3). The fisherman 108 and boat 142 also act to hide the slot in the panel of upper display area 32.

The threaded rod 146 is coupled to a coupler 148, which in turn is coupled to the output shaft of stepper motor 58*a*. Although not illustrated, shaft 146 is supported on the end opposite the end connecting to coupler 148 by a bearing that is fixed to a structural member of the giving device 10. The base 144 and threaded rod 146 convert the rotational output of stepper motor 58*a* into a translational output that is highly accurate and repeatable. In an alternative embodiment, a linear actuator replaces stepper motor 58*a* and threaded rod 146.

In an alternative embodiment motor 58*a* is coupled to a support (such as mount 132) that in turn is moved horizontally so that the fisherman 108, pole and line 114, indicator 116 and boat 142 move horizontally as well as vertically within boat 142. The slot defined by the panel of upper display area 32 is wide enough to enable such horizontal movement. Also, the range of motion horizontally is restricted and the boat 142 is sized so that the horizontal movement of character 108 does not impinge an inner surface of the motion profile reel 124.

Figure 5:
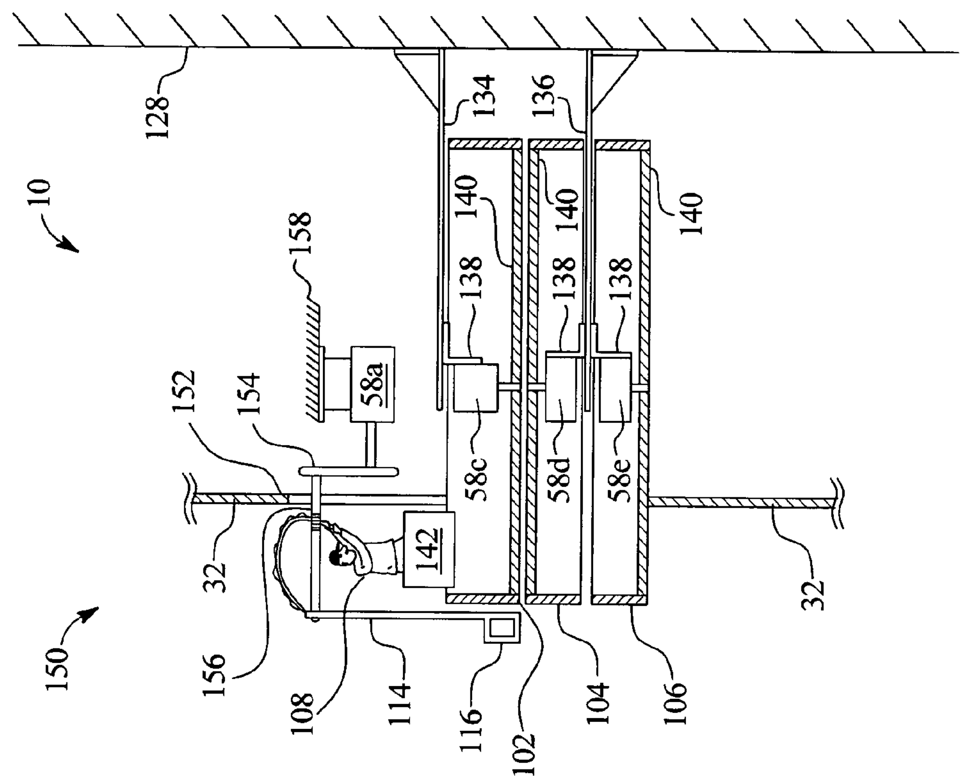
FIG. 5 is a sectioned side view of the gaming device illustrating an alternative embodiment for producing the rotational and translational motion of the present invention.

Referring now to FIG. 5, an alternative display device 150 is illustrated. Alternative display device 150 includes many of these same components described above in connection with display device 100. For example, display device 150 includes three reels 102, 104 and 106 that extend outwardly from a panel of the upper display area 32. The reels 102 to 106 are driven respectively by motors 58*c* to 58*e*. Those motors are connected via mounting flanges 138 to mounts 134 and 136, respectively. Mounts 134 and 136 are fixed to structural member 128 of gaming device 10. The motors 58*c* to 58*e* are coupled to reels 102 to 106, respectively, via struts 140 as described above. The indicator 116 is located on the distal end of a member 114, wherein motor 58*a* drives and translates member 114.

Display device 150 differs from display device 100 in a number of ways. First, display device 150 does not have a separately moveable motion profile portion 124 as shown in FIG. 4. Also, display device 150 does not include a motion profile portion 124 attached integrally to upper reel 102 as shown in FIG. 3. It should be appreciated however that either configuration for the motion profile portion 124 is alternatively provided in connection with display device 150. If a motion profile portion 124 is provided, mount 134 attaches alternatively to a vertically overhanging structural member, such as member 158 that supports motor 58*a*.

The primary difference between display device 150 and display device 100 is in regard to the linkage between member 114 and motor 58*a*. The panel of upper display area 32 defines a circular opening 152 that is large enough to enable a base 154 to rotate a base member 156 through a radius defined by the distance between the center of the shaft of motor 58*a* and the location of base member 156 on base 154. Base 154 is colored and textured to look like the background on the panel of upper display area 32 to hide the opening 152 as much as possible.

The base 154 is a disk that is coupled to the output shaft of motor 58*a*. The disk-shaped base 154 causes base member 156 to rotate. Base member 156 in turn causes the member 114 and indicator 116 to travel in a circular pattern with respect to the reels 102 to 106. In one embodiment, the member 114 is rotatably or hingedly connected to base member 156 so that the member 114 and indicator 116 point substantially downwardly at all times regardless of the location of base member 156. In an alternative embodiment, base member 156 is rotatably or hingedly connected to base 154 to achieve the same outcome. Also, character 108 and boat 142 can connect rotatably or hingedly to base member 156 so that the character 108 in boat 142 hangs downwardly at all times.

The radius of rotation of the disk-shaped member 154 is sized so that indicator 116 travels vertically enough to cover, reach or indicate any symbol in any row of any of the reels 102 to 106. The boat 142 is likewise sized so that the bottom of the boat remains below the top edge of reel 102 when the base member 156 is in its top-most position. In an embodiment, the motion profile portion 124 is included so that reel 102 extends upwardly as boat 142 is in its upward-most position. That profile helps enable the reel 102 to have enough clearance to allow boat 142 to move downwardly and not contact strut 140 of reel 102 when the base member 156 is in its lowest-most position. As stated above, motor 58*c* and mounting flanges 138 couple to structural member 158 to allow upper reel 102 to have the freedom to rotate when the motion profile portion 124 is provided.

Figure 6:
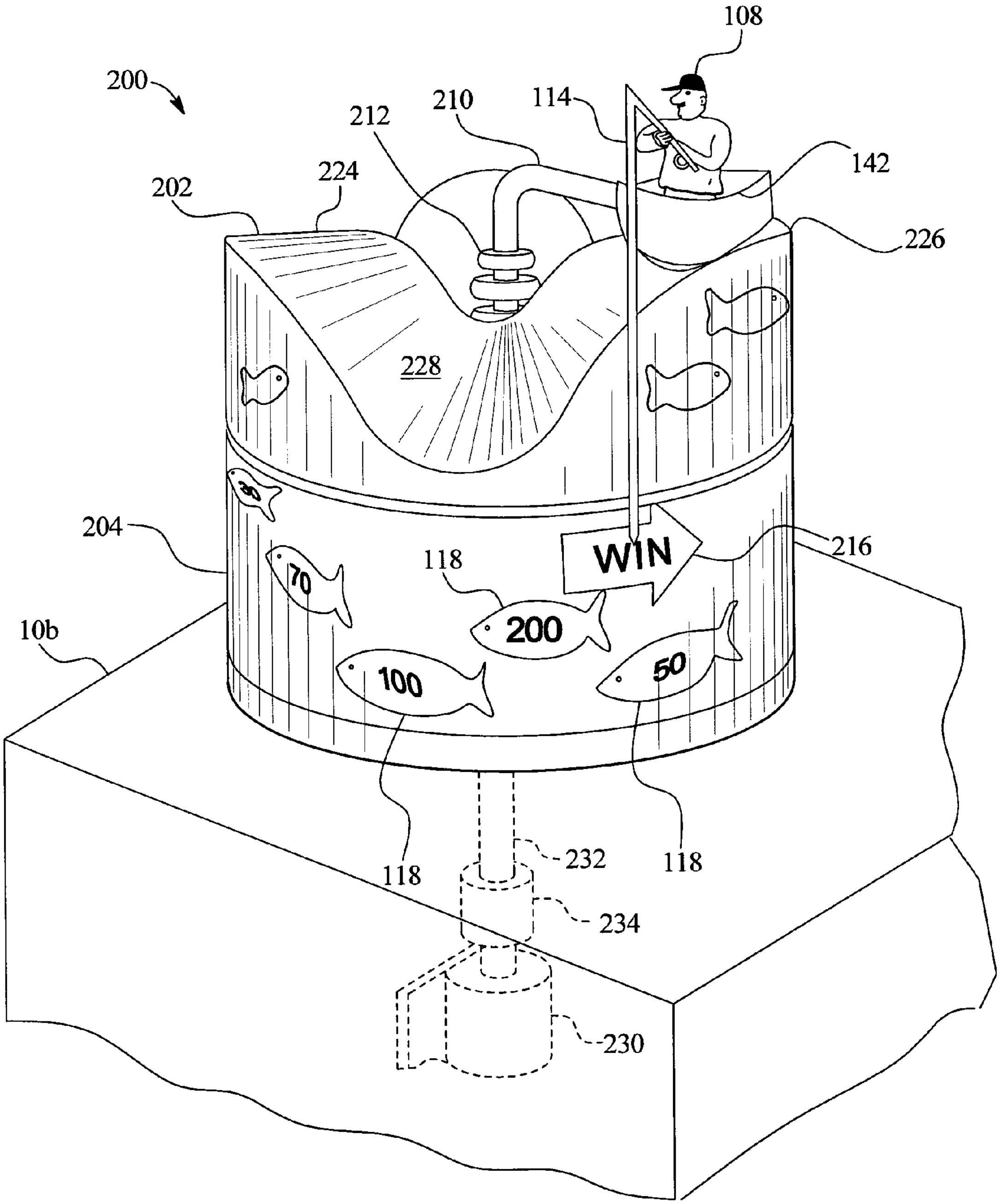
FIG. 6 is a perspective view of a further alternative embodiment of the display device of the present invention, wherein the indicator is spring loaded to follow a cam profile defined by one of the reels.

Referring now to FIG. 6, a further alternative display device 200 is illustrated. Display device 200 is provided either in place of the top box portion, i.e., the upper display area 32 (shown in FIG. 1A) or is placed on top of the gaming device shown in FIG. 1A or 1B. In FIG. 6, display device 200 is provided on top of the gaming device 10*b* (FIG. 1B). Display device 200 includes certain of the same components as the previous display devices 100 and 150. For example, display device 200 includes the character or fisherman 108 holding a member 114. Member 114 is attached to an alternative indicator 216. Indicator 216 points to a selected award symbol 118. The indicator 116 shown in FIGS. 4 and 5 on the other hand is positioned around a selected award symbol 118.

Display device 200 includes two reels 202 and 204. As described previously, and in accordance with the apparatus disclosed herein, separate motors (not illustrated), such as stepper motors, rotate reels 202 and 204 in opposite directions. The directions of rotation are indicated by award symbols 118. It should be appreciated however that the reels of the display devices 100, 150 and 200 can rotate in the same direction or opposite direction as desired.

The reel 202 defines a cam-like profile 224, similar to the motion profile of portion 124 described above. Profile 224 includes projections 226 and depressions 228 that form a surface upon which character 108 and boat 142 ride. Boat 142 can include one or more friction reducing devices, such as ball bearings, wheels or rollers that allow the boat 142 to roll across the surface defined by projections 226 and depressions 228 of the cam-like profile 224. Also, when reel 202 rotates, the character 108 and boat 142 move vertically up and down but are constructed not to move horizontally. Indicator 216 is thereby maintained to point to an award symbol 118 that is substantially in the center of gaming device 10*b*.

Either the character 108 or boat 142 is fixed to a shaft 210. Shaft 210 is biased via a spring or other biasing mechanism 212 to pull the boat towards the surface of profile 224 regardless of whether the surface underneath boat 142 is a projection 226 or depression 228. The vertical difference between projection 226 and depression 228 is sufficient to allow indicator 216 to point to or otherwise indicate any of the award symbols 118 in any row of either reel 202 or reel 204.

As described above, the ultimate award provided to the player as part of a base or bonus game is or is based on the symbol 118 indicated when the reel displaying that symbol stops rotating and when the indicator 216 stops translating. In the illustrated embodiment, only the reel 204 includes award symbols 118. In an alternative embodiment, the projections 226 are sized so that the indicator 216 raises enough to indicate a symbol on reel 202. In that embodiment if the indicator 206 indicates a symbol on reel 202 only reel 202 has to stop. That is reel 204 can continue to rotate if desired and vice versa. In the illustrated embodiment, in order to indicate a symbol on reel 204, reel 202 has to likewise stop rotating to fix the position of the member 114 and indicator 216.

In an alternative embodiment also illustrated by FIG. 6, biasing mechanism 212 is alternatively a motor coupler that couples shaft 210, boat 142, member 114 and indicator 216 to a first motor, such as a stepper motor (not illustrated). That first motor rotates boat 142, shaft 210, member 114 and indicator 216 horizontally across reel 204 and possibly additionally reel 202. Indicator 216 indicates various award symbols 118 at different times via any of the methods and apparatuses described above for indication.

The motor that rotates shaft 210 (and connected apparatus) is in turn connected to a member (not illustrated) that is driven via a lead screw 232 and motor coupler 234 by a motor 230. Motor 230 causes the shaft 210, boat 142, member 114 and indicator 216 to move vertically up and down. Lead screw 232 enables the boat 142 to be positioned precisely.

The combined motion caused by the rotational and translation motors allows boat 142, fisherman 108, member and indicator 216 to follow the projections 226 and depressions 228. Reel 204 or reels 202 and 204 also rotate in one embodiment so that each of the symbols 118 is displayed to the player. Stepper motors enable the acceleration, velocity and position of boat 142 (and accompanying equipment) to be set and varied. Reels 202 and 204 can rotate in the same direction continuously or change direction to rotate counter to the rotation of fisherman 142, which can also change directions.

Ultimately, the dual or triple motors stop rotating, wherein indicator 216 indicates one of the award symbols 118 for the player. The award associated with the indicated symbol 118 is provided to the player as described herein.

Figure 7:
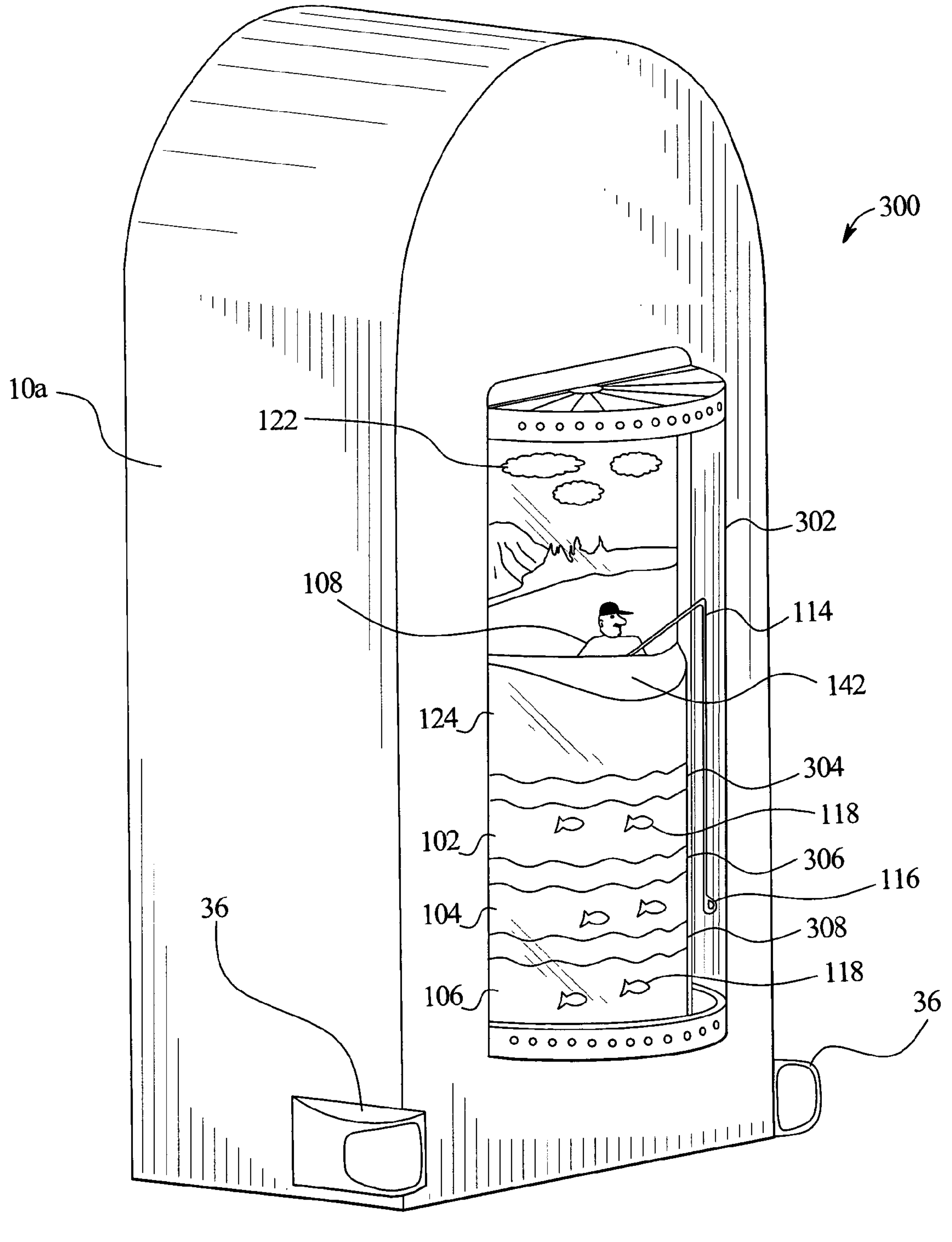
FIGS. 7, 8, 9, 10, 11 and 12 are perspective and elevation views of one embodiment of the display device of the present invention, which includes dual vertically moving objects and four rotating devices or reels.
Figure 8:
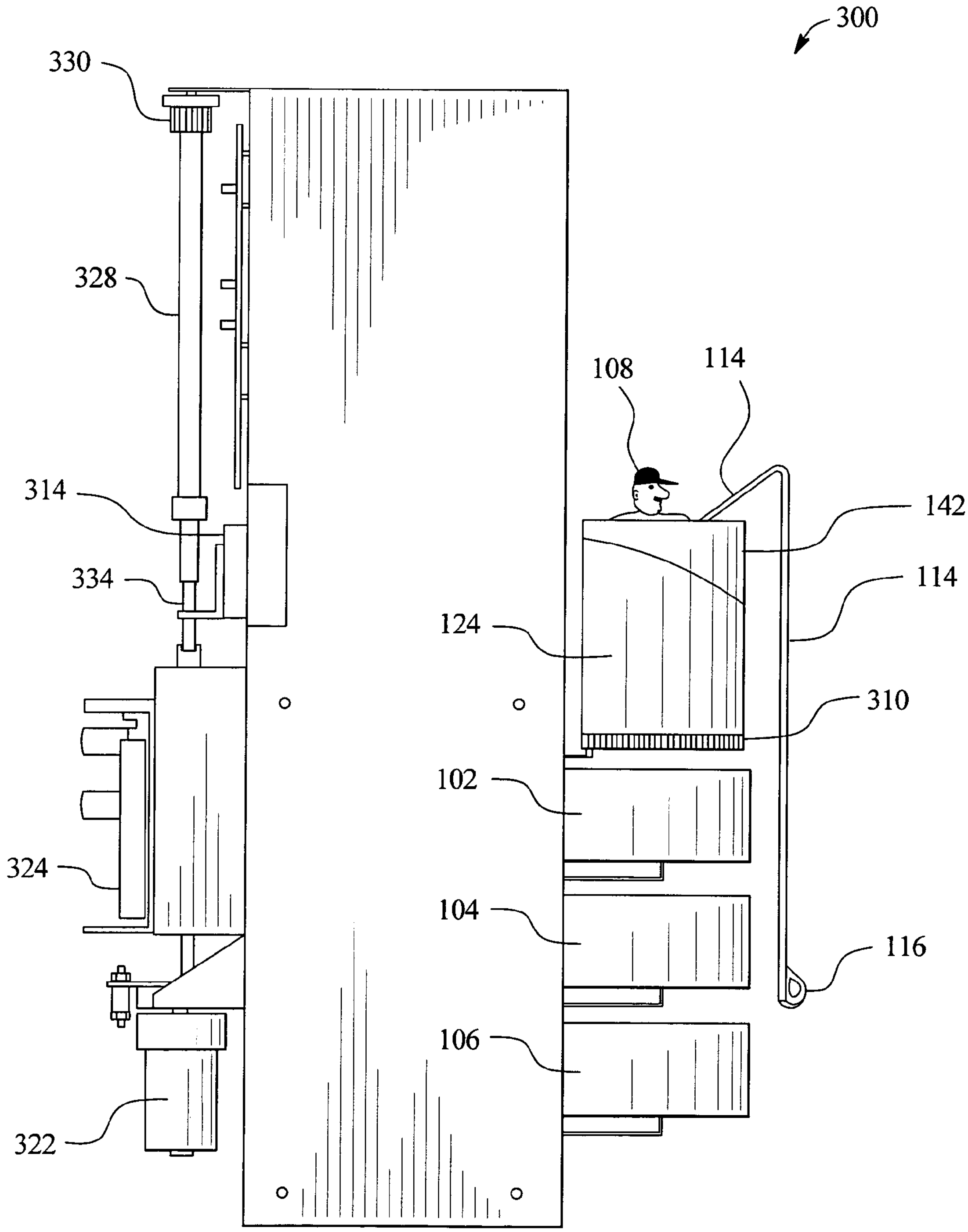
Figure 9:
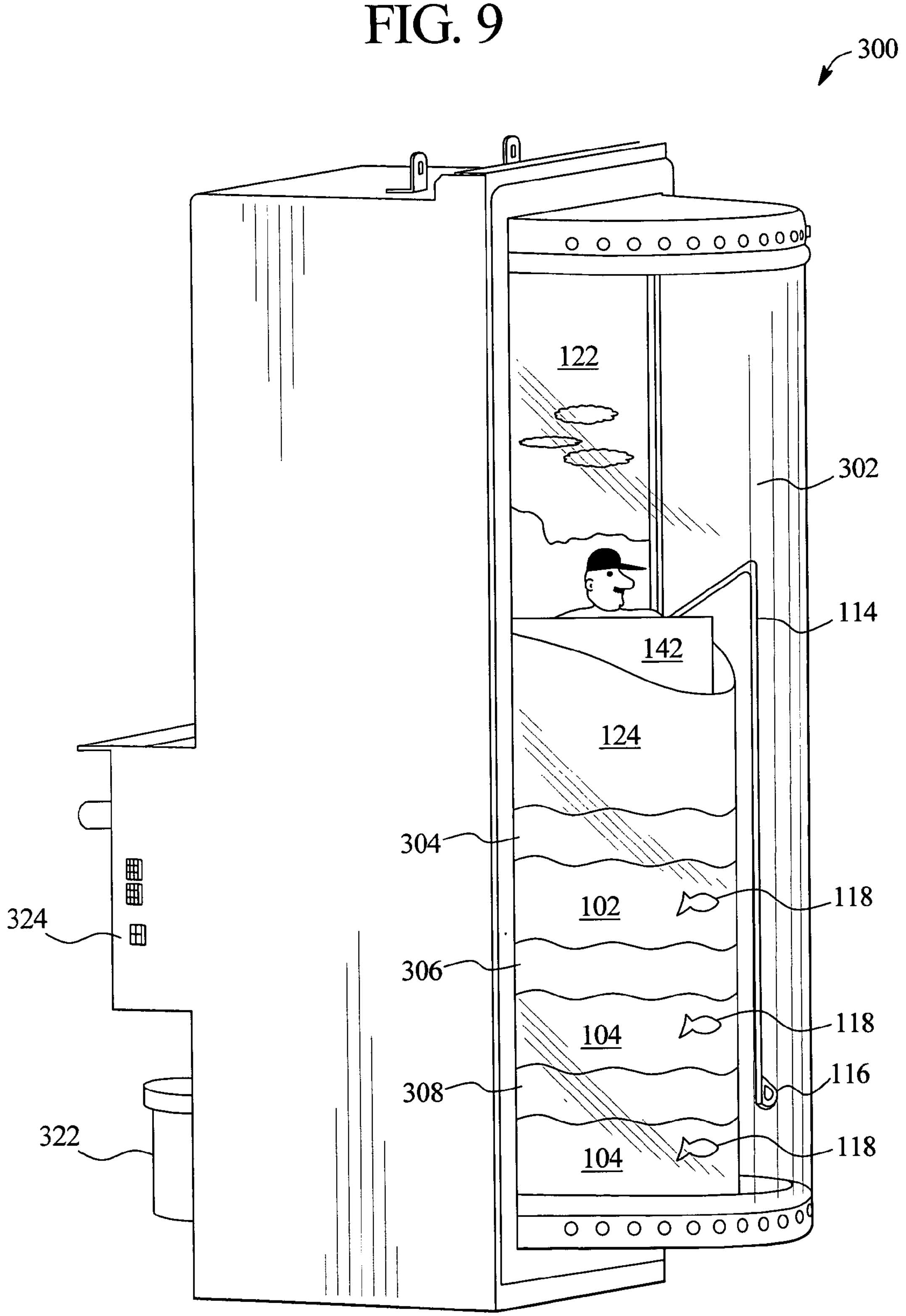

Referring now to FIGS. 7 to 12, one embodiment for the electromechanical display device is illustrated by display device 300. Display device 300 includes various components described above such as reels 102, 104 and 106, character 108, rod, or member 114, indicator 116, award symbols 118 on the reels, the background portion 122 of upper display area, the top portion or wave 124 (which is moveable independently as described below) and boat or member 142. The display device 300 is housed inside a clear plastic or hard glass casing 302, as seen in FIGS. 7 and 9.

Reels 102, 104 and 106 are sandwiched between covers 304, 306 and 308. Cover 304 hides the gaps between upper independently rotating portion 124 and top reel 102. Cover 306 hides the gap between reels 102 and 104. Cover 308 hides the gap between reels 104 and 106. FIG. 8 shows the reels 102, 104 and 106 without the covers. FIG. 9 shows the reels of FIG. 8, which have been blended together visually via covers 304, 306 and 308. Those covers are wavy or wave-like in the illustrated embodiment so as to make the motion of the reels appear wave-like or wavy. The upper portion 124 itself has a contoured wave shape so that its rotation about boat 142 appears wave-like or wavy.

Reels 102, 104 and 106 are driven by motion producing devices, such as devices 58*c* to 58*e* shown in FIGS. 4 and 5. Motion producing device 58*b* shown in FIG. 4 for rotating upper portion 124 is replaced by motion producing device or stepper motor 336 illustrated in FIG. 12, the operation of which is described in detail below.

The operation of the member 114 and indicator 116 with respect to the reels 102, 104 and 106 and award symbols 118 is substantially as the same as described above. That is, member 114 and indicator 116 translate vertically, while reels 102 to 106 as well as upper portion 124 rotate in various directions, at various speeds, and accelerations as described herein. Eventually, indicator 116 indicates or points to one of the award symbols 118 located on reels 102, 104 and 106. One method for utilizing or incorporating the indicated award symbol 118 is described below in connection with FIGS. 13 to 17.

The display device 300 is housed inside cabinet 10*a* as shown above for gaming device 10. Display device 300 is operable with a multitude of different cabinet styles and types, such as cabinet 10*b* described above.

Figure 10:
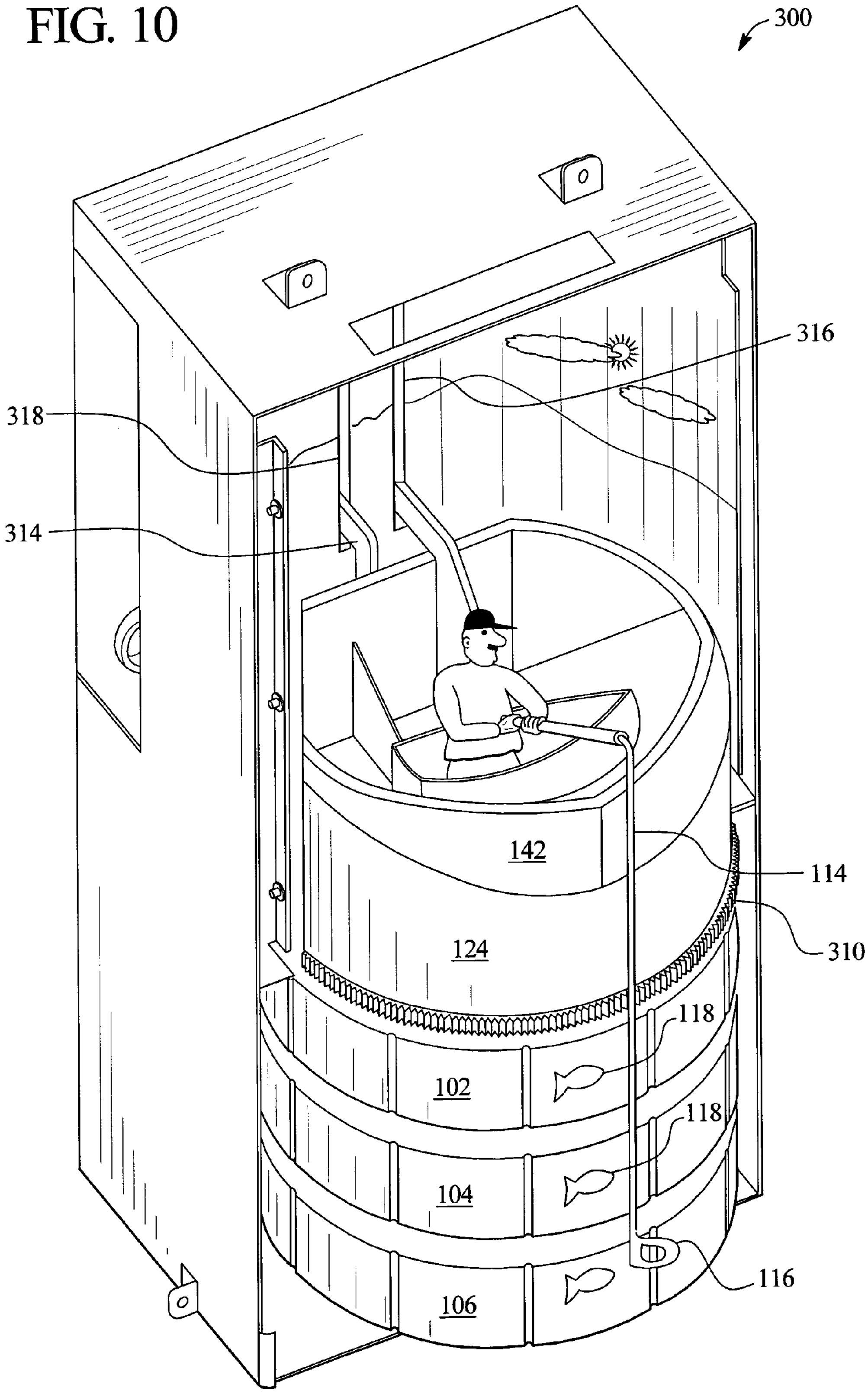

FIG. 10 is a perspective view showing in particular the fisherman 108 residing within boat 142, wherein the fishing pole or member 114 having the hook in or indicator 116, extends from fisherman 108. As discussed in more detail below, the display device 300 enables the fisherman 108 and boat 142 to be moved or translated independently with respect to each other. The fisherman 108 is coupled to bracket 312, while boat 142 is coupled to bracket 314. Brackets 312 and 314 extend through slots 316 and 318 defined by background 122. Slots 316 and 318 are sized to enable the necessary amount of motion for each of the fisherman 108 and boat 142, respectively. Slots 316 and 318 are also as thin as possible so as not to disrupt the background 122 anymore than is necessary. In one embodiment, rubber or otherwise deflectable flaps are provided in front or back of background 122, around slots 316 and 318, to further camouflage those slots and to prevent dirt and other particles from entering gaming device 10.

FIG. 10 also shows a gear 310 to which upper portion 124 is mounted. The gear is driven by stepper motor 336 and mating gear 340 shown below in FIG. 12.

Figure 11:
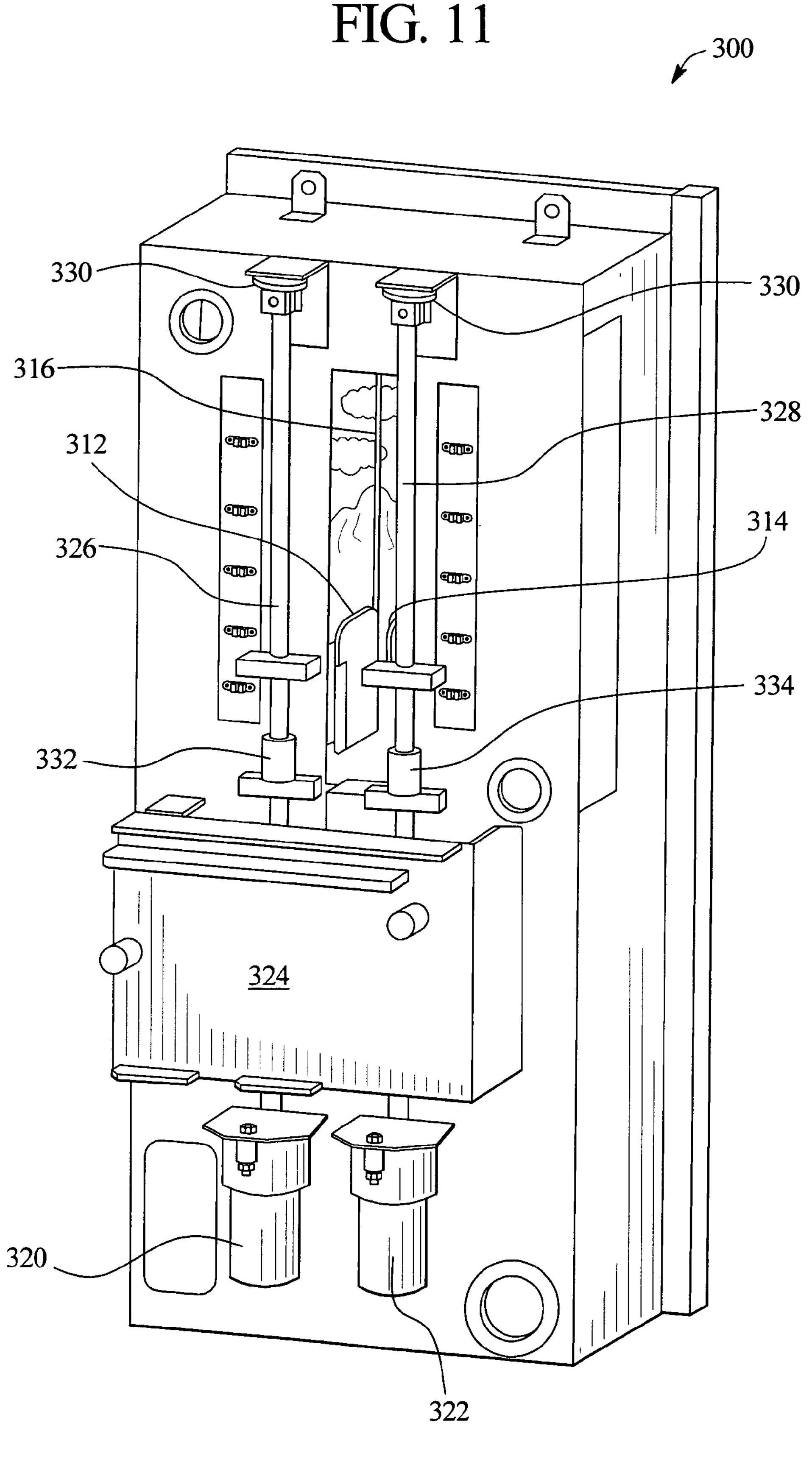

FIGS. 8, 9 and 11 show the motion producing apparatus for the first translating member or fisherman 108 and second translating member or boat 142. In the illustrated embodiment, each of those items can move vertically and translationally with respect to reels 102, 104 and 106 and the award symbols 118 displayed thereon. The boat 124 and fisherman 108 are independently operated by two separate motion producing systems, so that one may move, while the other one does not move. The fisherman 108 and boat 124 can be moved together, at the same or different velocity and acceleration. Alternatively, the boat 124 and fisherman 108 can be moved in opposite directions, at different velocities, at different accelerations and at different times or over different periods of time.

FIG. 11 shows brackets 312 and 314 extending through slots 316 and 318 and into the back of display device 300, wherein bracket 312 is coupled to fisherman connector 332 and bracket 314 is coupled to boat connector 334. Connectors 332 and 334 define hollow female threads that mate with male threads of lead screws 326 and 328. Lead screws 326 and 328 are supported at multiple points by bearings 330.

Lead screws 326 and 328 are driven at one end by motion producing devices 320 and 322, which in one embodiment are stepper motors. Stepper motors 320 and 322 are in turn driven by motion control board 324. Board 324 or memory device 40 stores a motion control program as described above. Board 324 or memory device 40 operates with processor 38 to receive commands to execute the motion control program. Board 324 then converts the computer signals into motor currents that turn the motor shafts of motors 320 and 322 a prescribed number of revolutions at a set velocity and acceleration. That rotational motion is converted via the lead screws 326 and 328 to a linear motion for connectors 332 and 334, for the man and boat, respectively.

The fisherman 108 and boat 142 are positioned within fractions of an inch and are operable to move at desired velocities, in desired directions and at desired accelerations. The fisherman 108 can appear to move in or out of the boat 142, which in turn appears to move up and down on top of the water 124. The combination of motion of the fisherman 108 and boat 142 enables indicator 116 to traverse the entire distance between the upper reel 102 and the lower reel 106.

Figure 12:
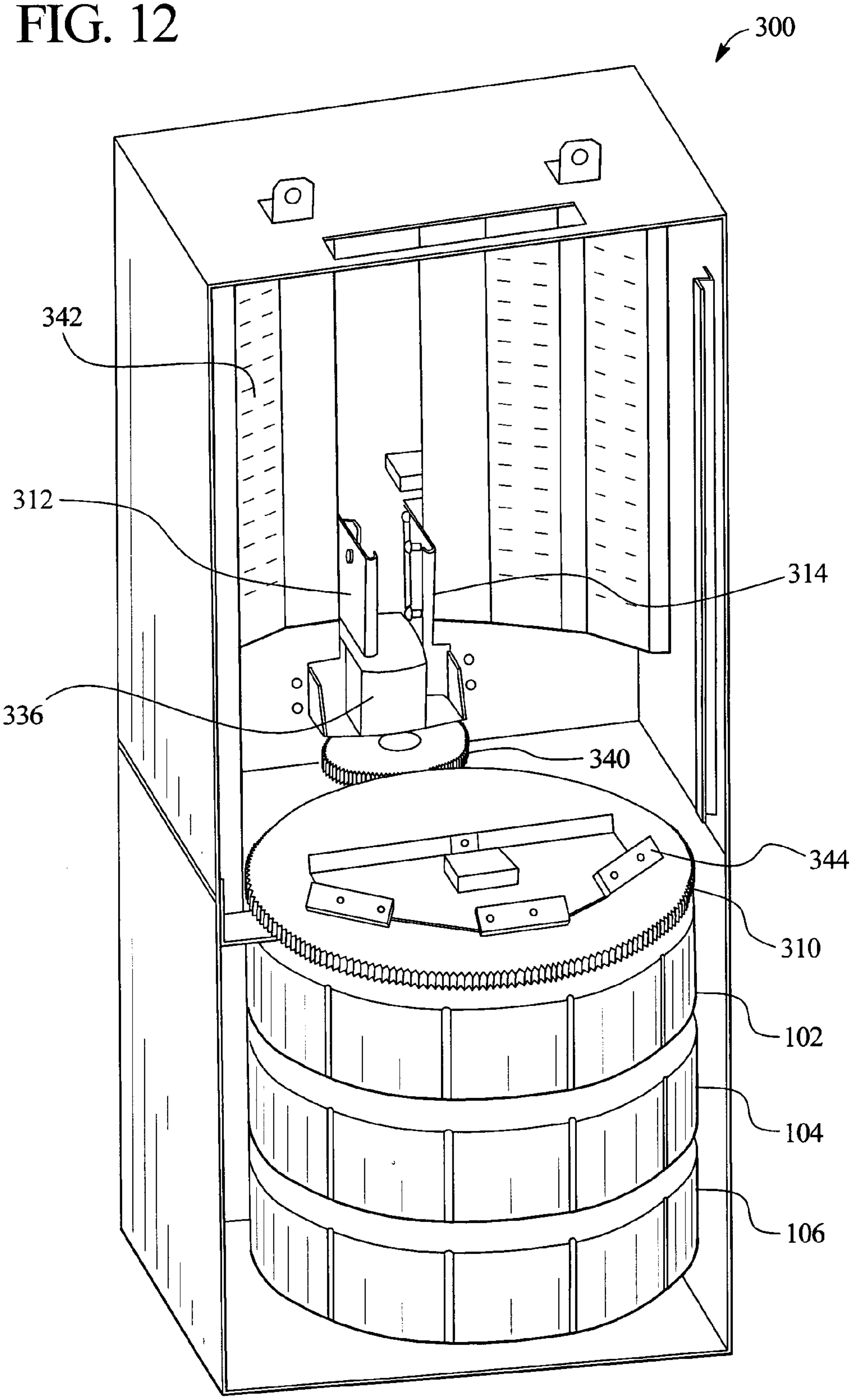

FIG. 12 is a similar perspective view to the front of display 300 as shown in FIG. 10. In FIG. 12, however, the fisherman 108, boat 142, upper wave portion 124, background 122 and the visible portion of brackets 312 and 314 of FIG. 10 have been removed. FIG. 12 illustrates the motor 336, which drives gear 340, which in turn drives gear 310. Upper wave portion 124 is affixed to gear 310 as seen in FIG. 10. Light emitting diodes ("LEDs") or other types of lights 342 are provided behind background 122 to illuminate same. The LEDs or other types of lights can be white or colored depending on the desire of the implementor. LED's or Lights 344 illuminate boat 142 and fisherman 108.

Figure 13:
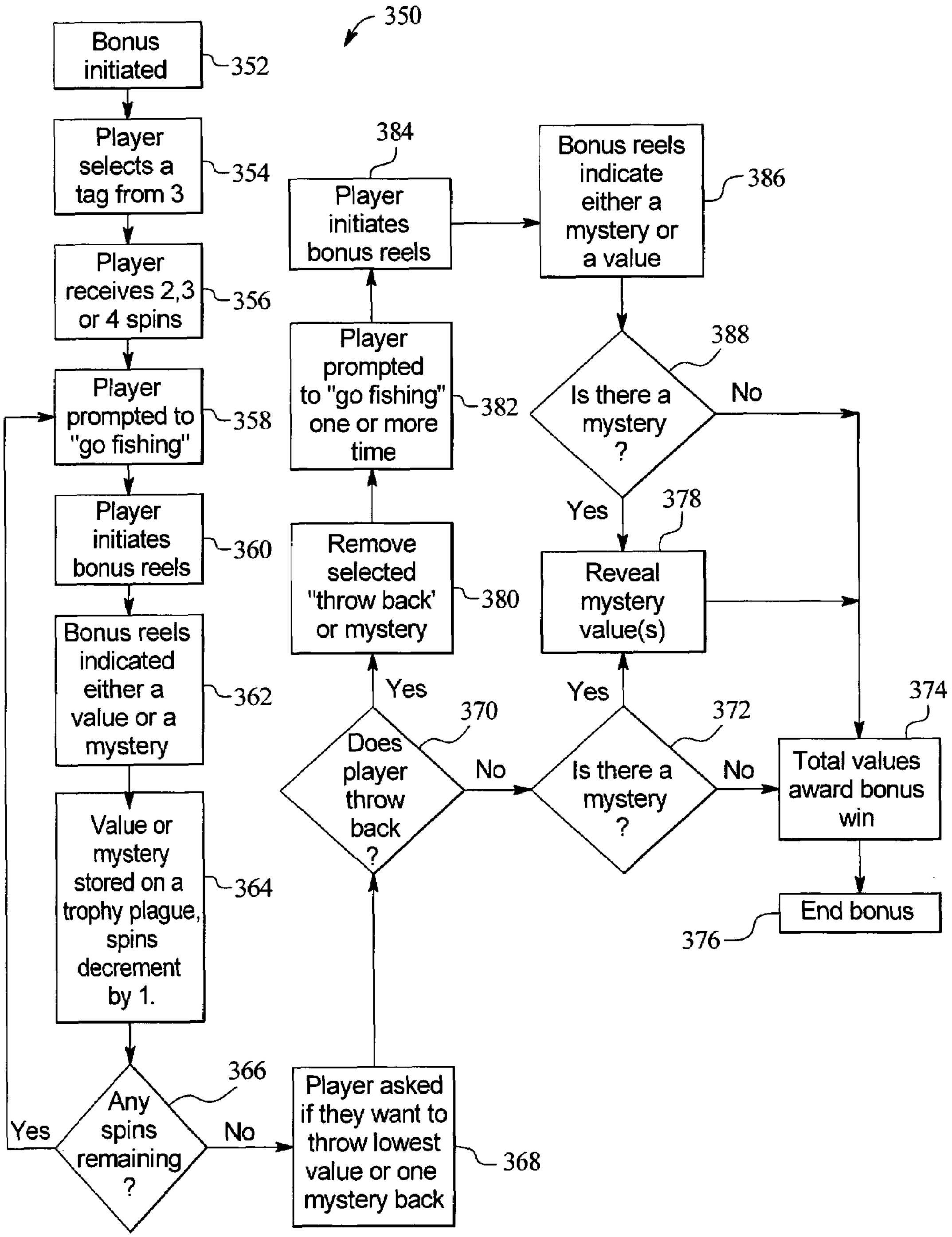
FIG. 13 is a schematic flow diagram of one method of operating the mechanical display devices of the present invention.

Referring now to FIG. 13, one method 350 for interfacing gaming device 10 with the display devices 100, 150, 200 and 300 of the present invention is illustrated. That is, method 350 is operable with any of the electromechanical display devices discussed above. In method 350, upon initiating the bonus, as indicated by block 352, the player is prompted to pick a selection from a plurality of selections, such as three selections, as indicated by block 354.

The remainder of method 350 is illustrated in combination with three selections, however, the principles of the method are applicable to any suitable number of selections. The selections each yield a number of spins of the electromechanical device 100, 150, 200 or 300. In the embodiment illustrated in FIGS. 14 to 17, one selection yields two plays or spins of the electromechanical device, another selection yields three plays or spins and the third selection yields four plays or spins, as indicated by block 356. The selections can yield other amounts of plays or spins as desired by the game implementor.

When the player has received the number of spins or plays, the game prompts the player to view the electromechanical display device 100, 150, 200 or 300, as indicated by block 358. In one embodiment, following the Price is Right™ game theme, the player is prompted to "go fishing." That message directs the player to stop viewing the video monitor 30 upon which the initial and latter parts of the game is played and to view instead the electromechanical display, which forms an intermediate or middle portion of the game.

The player is prompted to initiate a first one of the plays provided to the player, e.g., to initiate the spinning of one or more reels, such as reels 102 to 106. Although not illustrated, gaming device 10 provides, in one embodiment, an input device 44, which is simulated or electromechanical that causes the reels 102 to 106 to spin and the upper wave area 124 to spin and the fisherman 108 and possibly boat 142 to translate with respect to the spinning reels, as indicated by block 360. The indicator 116 then indicates one of the symbols 118, which is one of the different types of values described above or is a mystery value, as indicated by 362. The mystery value is revealed at a different point in time in the sequence of method 350. In alternative embodiments discussed above, a dual indicator is provided, so that symbols on more than one of the reels is indicated.

Figure 15:
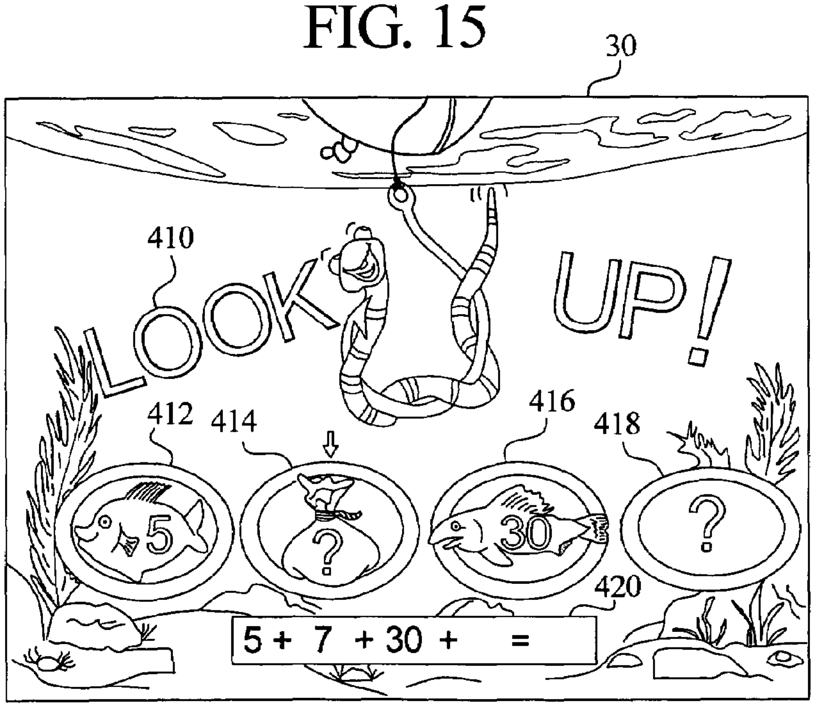
Figure 16:
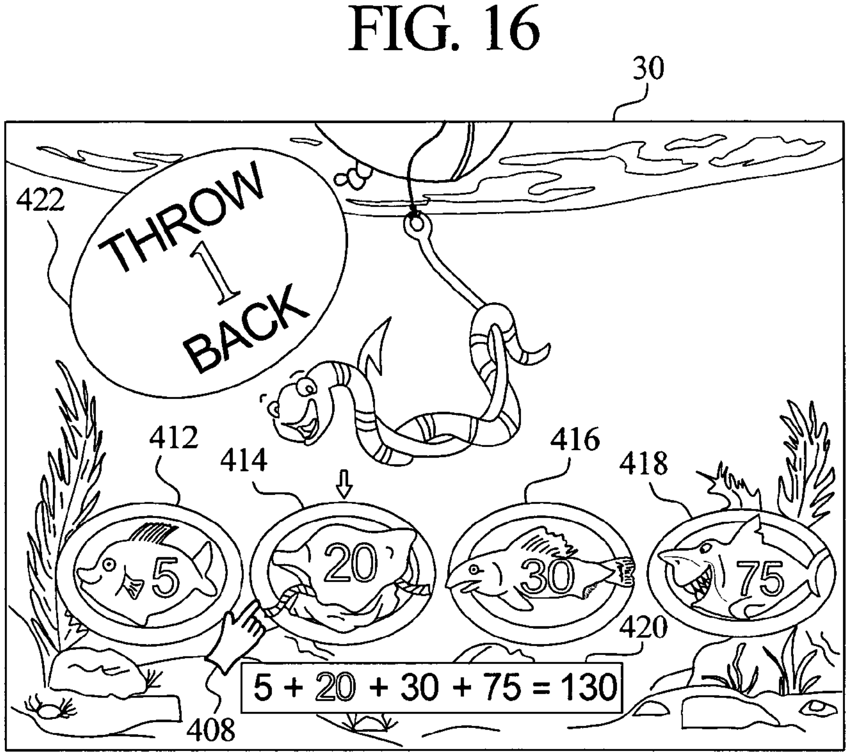
Figure 17:
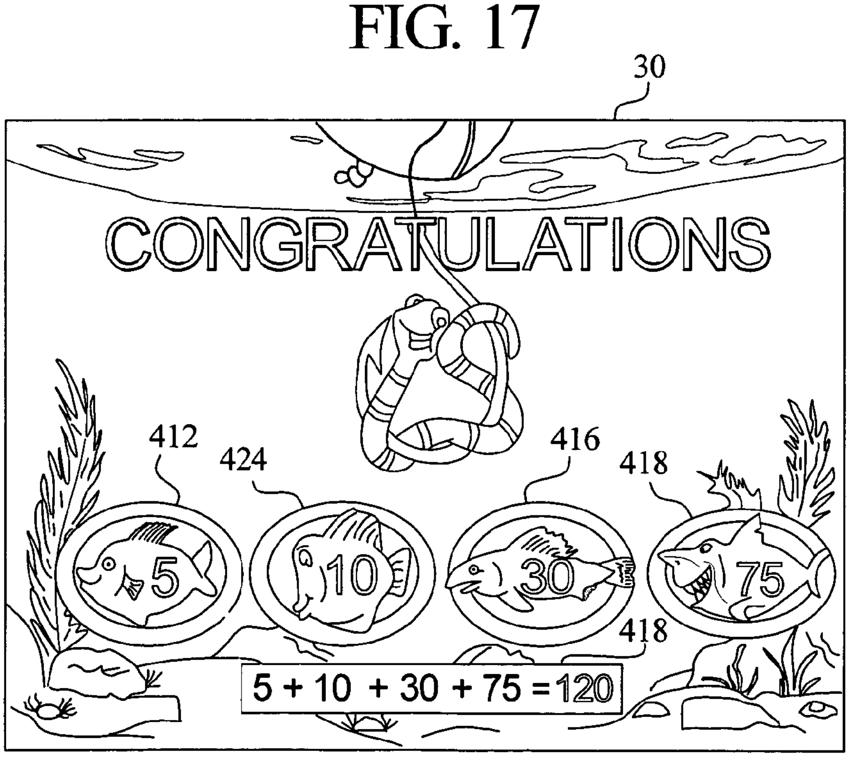

Gaming device 10 stores and displays the value or mystery value indicia on a portion of display device 30, which in keeping with the theme of the game, can be a trophy plaque, as seen in screen shots of FIGS. 15 to 17. The player's spins are decreased by one, as indicated by block 364.

If the player has remaining spins, as indicated by diamond 366, the game prompts the player to view again the electromechanical display device 100, 150, 200 or 300, as indicated by block 358, and the sequence between block 358 and diamond 366 is repeated. If the player does not have any spins remaining, that is, the player has exhausted all spins as indicated by diamond 366, the player is provided an accept/reject or keep/discard option as indicated by block 368. In one embodiment, the player is allowed to discard one or more value or mystery, e.g., to throw back one of the fishes 118 indicated by the electromechanical display device.

If the player does not throw back or discard the one or more allotted values, as indicated by diamond 370, the gaming device determines whether one of the originally presented values is a mystery value, as indicated by diamond 372. If there are no mystery values, as indicated by diamond 372, gaming device 10 totals the generated values to form an award for the player. In one embodiment, the award is a bonus win, as indicated by block 374. Method 350 then ends, as indicated by block 376.

If the player does not throw back one of the values initially chosen for the player, as indicated by diamond 370, but there is a mystery value, as indicated by diamond 372, the game reveals the mystery value, as indicated by block 378. It is possible that the player receives and the game reveals multiple mystery values. In one embodiment, the mystery values, when revealed, are of any of the types discussed above. In one implementation, the mystery values can yield more valuable award components on average or in each case than the values that are not revealed via a mystery value. The values are then totaled as indicated by block 374 and the game ends as indicated by block 376.

If the player does throw back one or more of the values, as indicated by diamond 370, the game removes from monitor 30 the selected one or more values or mystery values, as indicated by block 380. The player is then told to view the electromechanical display 100, 150, 200 or 300 again to generate one or more make-up values, as indicated by block 382. The electromechanical display, therefore, plays at least one role in the game to generate the initial values and may be seen at the end of the game again to generate one or more make-up values.

The player accordingly initiates the one or more final plays of the electromechanical display device 100, 150, 200 or 300, as indicated by block 384. In one embodiment, the player presses an input device 44 dedicated to setting in motion the one or more reels 102 to 106, the upper portion 124, the fisherman 108 and potentially boat 142.

The indicator 116 or multitude of indicators 116 indicate one or more values and potentially an additional mystery value, as indicated by block 386. If there are no mystery values, as indicated by diamond 388, the one or more new values is totaled with the values kept by the player to form an award, as indicated by block 374 and the game ends as indicated by block 376. If one or more mystery values is present after the second spinning of the reels of the electromechanical display, those mystery values are revealed, as indicated by block 378, the award is then totaled as indicated by block 374 and the bonus game ends as indicated by block 376.

Figure 14:
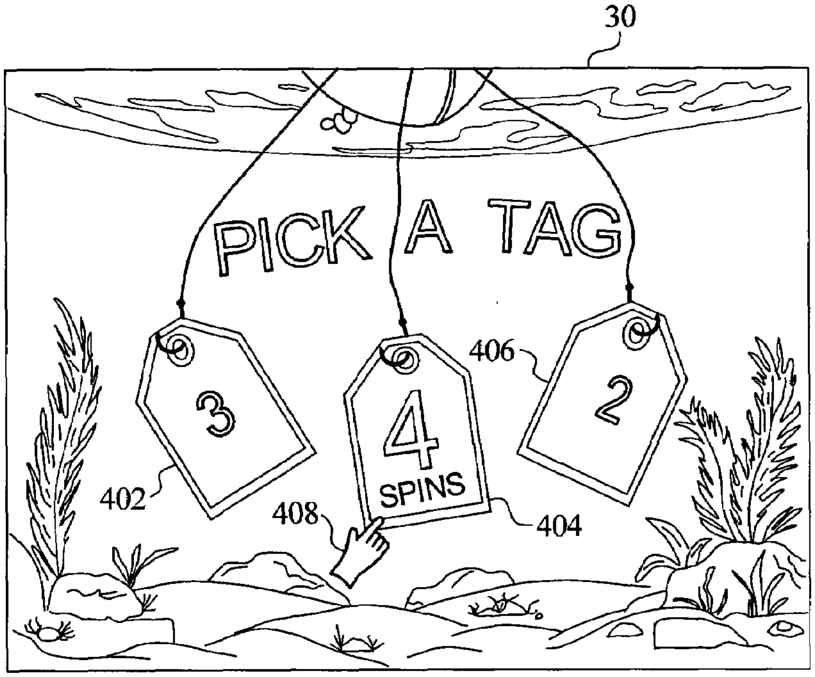
FIGS. 14, 15, 16 and 17 illustrate a story line using a video display device to show the method set forth in FIG. 13.

Referring now to FIGS. 14 to 17, screen shots of display device 30 illustrate a story board that shows the portion of the method 350 that is played out on the video monitor 30, rather than on the electromechanical display device 100, 150, 200 or 300. FIG. 14 illustrates three selections 402 to 406 and prompts the player to pick one of those selections. Player 408 picks the selection 404, which yields four spins of the electromechanical display device as discussed above. The spins or plays associated with non-picked selections 402 and 406 can also be revealed to show the player's relative success in picking a number of plays.

FIG. 15 illustrates that the video monitor 30 prompts the player to look up or at the electromechanical display device 100, 150, 200 or 300, as seen in visual, audio or audiovisual message 410. The electromechanical device then generates four symbols for the player, as indicated by the trophy rack or symbols 412, 414, 416 and 418. As illustrated, symbols 414 and 418 are mystery values. A value meter 420 is provided that shows the player the values associated with each of the value generations and totals the values, when possible. Meter 420 shows two question marks for the mystery values 414 and 418.

FIG. 16 illustrates the keep or trade option via audio, visual or audiovisual message 422. In the illustrated embodiment, gaming device 10 prompts the player to throw one or more of the fish or values back. As illustrated, player 408 decides to discard the mystery value 414 in exchange for another play of the electromechanical device and another award generation. The player may have made a better move by discarding the relatively low five value 412 instead of the mystery value 414 which is revealed in FIG. 16 to have a value of twenty. The twenty value is shown in phantom in meter 420, which totals the values to one hundred thirty to show the player what the player would have had had the player had not thrown the mystery value 414 back. Again, the values can be credit values, multipliers or any of the types of values discussed above. If multipliers are available and the player receives multiple multipliers, gaming device 10 in one embodiment adds the values and adds the multipliers and makes one multiplication to form an overall award.

FIG. 17 shows the player's final set of values, wherein new value 424 has replaced the previously generated value 414. The player has initiated the electromechanical device one more time to yield the 424 value, which is shown to be ten credits. While the player initiates the play of the electromechanical device in one embodiment, the device can alternatively be automatically initiated at the appropriate times, for example, upon the player's input to throw back a value or fish. Meter 420 shows the player the player's ultimate award, which is the addition of the values 412 through 418 or one hundred twenty credits.

It should be appreciated that the two members (i.e., the boat and man) are independently moveable in one embodiment of the present invention. This allows the man or first member to move relative to the boat or second member. This provides a visual display that accounts for the substantial distance which the indicator must move from the first reel to the third reel. The visual display does not look awkward due to the relative extensions of those two members. In the illustrated example, the man moves a distance of X across the reels and the boat moves a distance of X/2.

It should be understood that various changes and modifications to the embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a game initiated by a wager;

a housing;

a display area supported by the housing;

a plurality of reels positioned in said display area, the reels having a plurality of symbols and operable to rotate about an axis of rotation, each said reel having an outer surface;

an indicator positioned in the display area and operable to move substantially parallel to said axis of rotation and in a plane spaced from the outer surfaces of the reels to sequentially indicate one of the symbols on each of the reels, wherein said indicator is positioned in front of the reels and is adapted to cover a portion of each of the reels; and an award adapted to be provided to a player based on one of the indicated symbols of the reels after said reels and said indicator stop moving.

2. The gaming device of claim 1, wherein the axis of rotation is a substantially vertical axis and the indicator is operable to move in a substantially vertical direction.

3. The gaming device of claim 1, wherein at least two of the reels are operable to rotate in opposite directions with respect to each other about the axis of rotation.

4. The gaming device of claim 1, which includes three reels, wherein two of the reels are operable to rotate in a first direction about the axis of rotation and a third one of the reels is operable to rotate in a second different direction about the axis of rotation.

5. The gaming device of claim 1, which includes at least one first motion producing device operable to rotate the reels and at least one second motion producing device operable to move the indicator.

6. The gaming device of claim 5, wherein at least one of the first and second motion producing devices includes a stepper motor.

7. The gaming device of claim 5, which includes a plurality of the second motion producing devices operable to move individually the indicator and a second member configured to co-act with the indicator such that a movement of the second member results in a movement of the indicator, the movement of the second member being made substantially perpendicular to the axis of rotation of the reels.

8. The gaming device of claim 1, which includes a plurality of indicators operable to move in at least one plane relative to the rotation of the reels, the indicators each sequentially indicating different symbols on the reel.

9. The gaming device of claim 1, wherein the indicator is operable to stop over the indicated award symbol.

10. The gaming device of claim 1, wherein the indicator is operable to stop adjacent to the indicated award symbol.

11. The gaming device of claim 1, wherein the indicator is operable to stop and point to the indicated award symbol.

12. The gaming device of claim 1, wherein game is selected from the group consisting of: slot, poker, keno, blackjack, craps and bunco.

13. The gaming device of claim 1, wherein the indicator operates as part of a bonus game triggered upon an event in the game.

14. The gaming device of claim 1, wherein the symbols represent an award selected from the group consisting of: game credits, a multiplier of credits, a number of picks from a prize pool, a number of free spins, a number of free games, a bonus game, a non-monetary award and any combination thereof.

15. The gaming device of claim 1, which includes an additional reel without symbols operable to rotate with said reels.

16. A gaming device comprising:

a game initiated by a wager;

a housing;

a plurality of reels supported by the housing and operable to rotate about an axis of rotation;

a plurality of symbols on each of the reels;

an indicator operable to move substantially parallel to the axis of rotation and in a plane spaced from the reels to indicate different ones of the symbols as the reels rotate and the indicator moves, wherein said indicator is positioned in front of the reels and is adapted to cover a portion of each of the reels; and an award adapted to be provided to the player based on a first one of the symbols indicated by the indicator after the indicator stops moving and at least the reel displaying the first symbol stops rotating.

17. The gaming device of claim 16, wherein the award is based on the first symbol, the first symbol indicated after the indicator stops moving and each of the reels stop rotating.

18. The gaming device of claim 16, which includes a motor coupled to the indicator.

19. The gaming device of claim 16, wherein the indicator is spring loaded and moved by the rotation of one of the reels.

20. The gaming device of claim 16, wherein the indicator is biased to follow a motion profile provided by one of the reels.

21. The gaming device of claim 16, wherein each of the reels and the indicator is moved by a separate motion producing device.

22. The gaming device of claim 16, wherein the indicator is attached to a first mechanism that translates the indicator.

23. The gaming device of claim 22, which includes a second mechanism operable to translate in combination with the first mechanism.

24. The gaming device of claim 23, wherein the first and second mechanism, translate independently with respect to each other.

25. The gaming device of claim 16, which includes a video monitor operable to display a game that operates with the reels, symbols, indictor and award.

26. A method of operating a gaming device, said method comprising:

(a) initiating a game upon a wager by a player;

(b) rotating a plurality of reels having a plurality of symbols thereon;

(c) moving a movable indicator across the reels in at lease one direction, wherein said indicator is positioned in front of said reels and adapted to cover a portion of each of said reels;

(d) causing the indicator to indicate on one of the symbols when the indicator and the reel stop moving; and (e) providing an award to the player based on the symbol indicated.

27. The method of claim 26, wherein moving the indicator includes rotating and translating the indicator.

28. The method of claim 26, which includes moving a member in combination with the movement of the indicator.

* * * * *

UNITED STATES PATENT AND TRADEMARK OFFICE

CERTIFICATE OF CORRECTION

PATENT NO. : 7,485,038 B2
APPLICATION NO. : 10/659092
DATED : February 3, 2009
INVENTOR(S) : Markus Rothkranz It is certified that error appears in the above-identified patent and that said Letters Patent is hereby corrected as shown below:

IN THE DRAWINGS:

Fig. 13 (Sheet 14 of 16) #364, change "trophy plague" to --trophy plaque--.

IN THE SPECIFICATION:

In Column 1, Line 8, change "and a indicator" to --and an indicator--.

In Column 2, Lines 22-23, change "movable in direction" to --movable in the direction--.

In Column 5, Line 46, change "top of rectangular" to --Top of the rectangular--.

In Column 5, Line 52, change "devices 100, 150 and 200 is" to --devices 100, 150 and 200 are--.

In Column 9, Line 5, change "is moved" to --are moved--.

In Column 9, Line 13, change "flanges 138 is connected" to --flanges 138 are connected--.

In Column 12, Lines 42-43, change "symbols 118 is substantially as the same" to --symbols 118 are substantially the same--.

In Column 14, Line 22, change "parts of the game is played" to --parts of the game are played--.

In Column 14, Line 39, change "the reels is indicated" to --the reels are indicated--.

In Column 15, Line 32, change "values is present" to --values are present--.

UNITED STATES PATENT AND TRADEMARK OFFICE

CERTIFICATE OF CORRECTION

PATENT NO. : 7,485,038 B2
APPLICATION NO. : 10/659092
DATED : February 3, 2009
INVENTOR(S) : Markus Rothkranz It is certified that error appears in the above-identified patent and that said Letters Patent is hereby corrected as shown below:

IN THE CLAIMS:

In Claim 26, Column 18, Lines 36-37, change “in at lease one” to --in at least one--.

Signed and Sealed this

Nineteenth Day of May, 2009

John Doll

JOHN DOLL
*Acting Director of the United States Patent and Trademark Office*